US010108324B2

(12) United States Patent
Hegde et al.

(10) Patent No.: US 10,108,324 B2
(45) Date of Patent: Oct. 23, 2018

(54) DISPLAY DEVICE AND METHOD FOR CONTROLLING THE SAME

(71) Applicant: Samsung Electronics Co., Ltd., Suwon-si, Gyeonggi-do (KR)

(72) Inventors: Gautham Hegde, Bangalore (IN); Bala Bhaskar Veerannagari, Bangalore (IN); Chittur Ravichander Karthik, Bangalore (IN); Ramalingam Ramamoorthy, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 14/720,100

(22) Filed: May 22, 2015

(65) Prior Publication Data

US 2015/0339046 A1  Nov. 26, 2015

(30) Foreign Application Priority Data

May 22, 2014 (IN) ............................ 2547/CHE/2014
Apr. 30, 2015 (KR) ........................ 10-2015-0061580

(51) Int. Cl.
*G06F 3/0484* (2013.01)
*G06F 1/32* (2006.01)
*G06F 3/0488* (2013.01)
*G09G 5/377* (2006.01)
*G06F 3/14* (2006.01)

(52) U.S. Cl.
CPC ........ *G06F 3/04847* (2013.01); *G06F 1/3212* (2013.01); *G06F 1/3265* (2013.01); *G06F 3/04886* (2013.01); *G09G 5/377* (2013.01); *G06F 3/14* (2013.01); *G09G 2340/12* (2013.01); *G09G 2354/00* (2013.01); *G09G 2358/00* (2013.01); *G09G 2370/022* (2013.01);
(Continued)

(58) Field of Classification Search
CPC .................................................. G06F 3/04844
USPC ......................................................... 715/798
See application file for complete search history.

(56) References Cited

U.S. PATENT DOCUMENTS 7,296,184 B2  11/2007  Derks et al.
7,389,432 B2   6/2008  Chandley et al.
(Continued)

FOREIGN PATENT DOCUMENTS

EP    1 157 327 A1   11/2001
JP    2011-77600 A    4/2011
(Continued)

OTHER PUBLICATIONS

Smart Compositing: A Real-Time Content-Adaptive Blending Method for Remote Visual Collaboration Wei Hong, April Slayden Mitchell, Mitchell Trott HP Labs, Palo Alto, California 94034, Sep. 12, 2012.*

*Primary Examiner* — William D Titcomb
(74) *Attorney, Agent, or Firm* — Jefferson IP Law, LLP

(57) ABSTRACT

A display device is provided. The display device includes a display configured to display content on a screen and a processor configured to determine a region of the screen corresponding to an interest of a user in the content displayed on the screen, and display a masking element over a portion of the content displayed on the screen based on the region of the screen determined to correspond to the interest of the user. The masking element is displayed at a luminance level equal to or less than a luminance level associated with the content displayed on the screen.

20 Claims, 25 Drawing Sheets

(52) U.S. Cl.
CPC ....... *Y02B 60/1242* (2013.01); *Y02B 60/1292* (2013.01); *Y02D 10/153* (2018.01); *Y02D 10/174* (2018.01)

(56) References Cited

U.S. PATENT DOCUMENTS

| | | | |
|---|---|---|---|
| 8,225,229 B2* | 7/2012 | Thorn | G09G 5/00 715/764 |
| 8,687,840 B2* | 4/2014 | Samanta Singhar | G06F 1/3265 382/100 |
| 8,816,968 B2* | 8/2014 | Mishra | G06F 3/1438 178/18.01 |
| 9,262,072 B2* | 2/2016 | Kwon | G06F 1/3218 |
| 9,430,991 B2* | 8/2016 | Mazzola | G09G 5/37 |
| 9,620,072 B2* | 4/2017 | Ben-Harrush | G09G 3/3677 |
| 2003/0146897 A1 | 8/2003 | Hunter | |
| 2006/0087502 A1 | 4/2006 | Karidis et al. | |
| 2006/0101293 A1 | 5/2006 | Chandley et al. | |
| 2007/0002151 A1* | 1/2007 | Ozaki | G06T 7/0002 348/251 |
| 2007/0146344 A1 | 6/2007 | Martin et al. | |
| 2011/0185297 A1* | 7/2011 | Reid | G06F 3/04845 715/765 |
| 2011/0307843 A1 | 12/2011 | Miyazaki et al. | |
| 2012/0166989 A1 | 6/2012 | Brown et al. | |
| 2013/0152014 A1* | 6/2013 | Rabii | G06F 3/0485 715/785 |
| 2013/0263058 A1* | 10/2013 | Hoerentrup | G06F 3/048 715/840 |
| 2014/0282156 A1* | 9/2014 | Arita | G09B 29/106 715/766 |

FOREIGN PATENT DOCUMENTS

| | | |
|---|---|---|
| JP | 2011-101296 A | 5/2011 |
| KR | 10-2006-0109023 A | 10/2006 |
| KR | 10-1237443 B1 | 2/2013 |
| WO | 01-48588 A1 | 7/2001 |

* cited by examiner

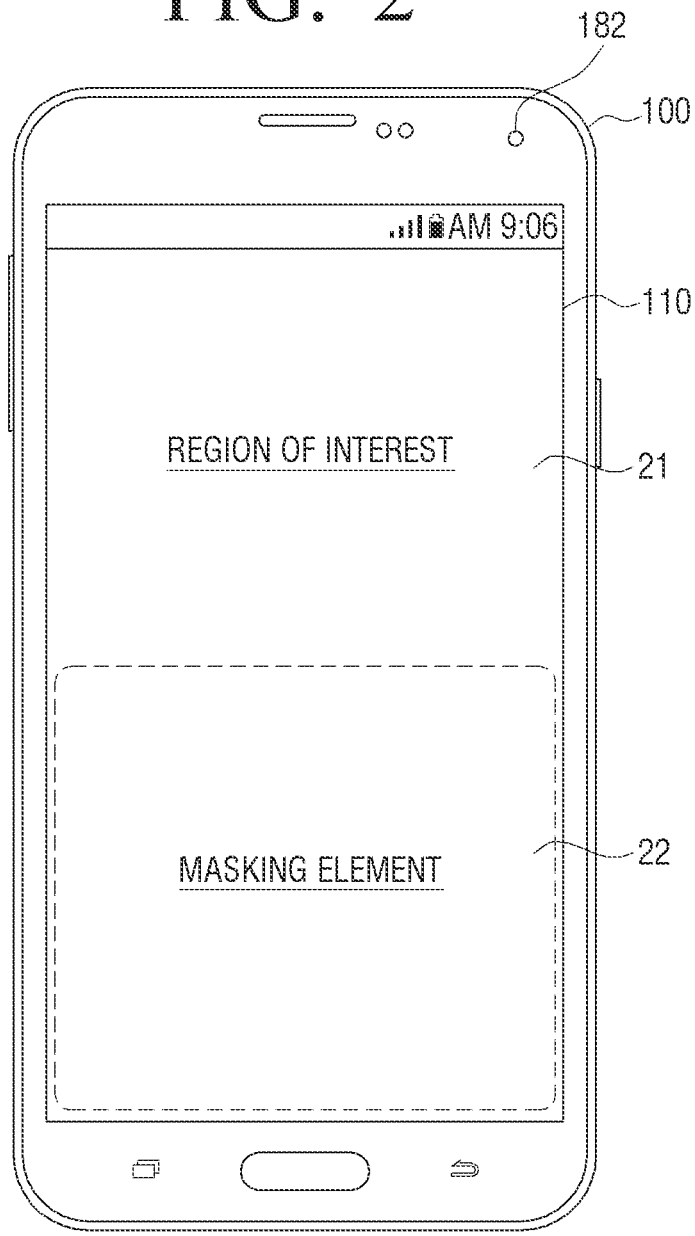

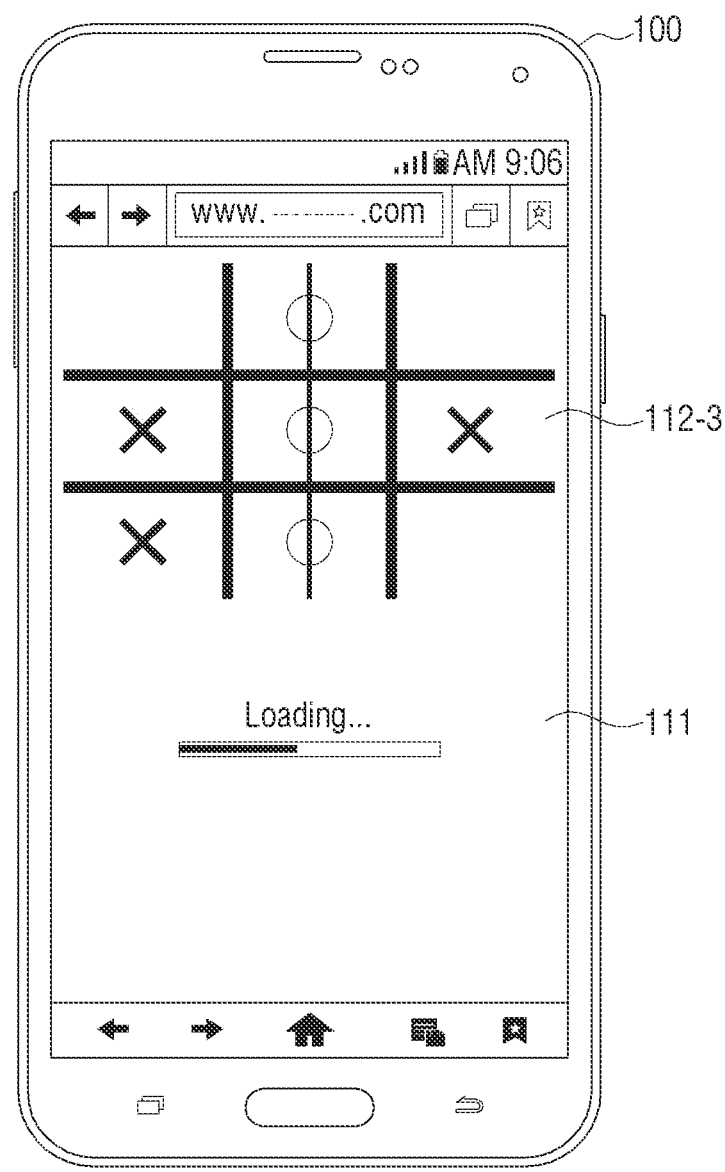

1

DISPLAY DEVICE AND METHOD FOR CONTROLLING THE SAME

CROSS-REFERENCE TO RELATED APPLICATION(S)

This application claims the benefit under 35 U.S.C. § 119(a) of an Indian patent application filed on May 22, 2014 in the Indian Patent Office and assigned serial number 2547/CHE/2014, and of a Korean patent application filed on Apr. 30, 2015 in the Korean Intellectual Patent Office and assigned serial number 10-2015-0061580, the entire disclosure of each of which is hereby incorporated by reference.

TECHNICAL FIELD

The present disclosure relates to a display device and a method for controlling the same. More particularly, the present disclosure relates to a display device and a method for controlling the same to display a masking element which can reduce power consumption.

BACKGROUND

Recently, the size and weight of a display device, such as a smart phone or a tablet personal computer (PC), has been reduced thereby improving portability. However, a display screen of the display device must still allow a user to easily view an image displayed on the display screen.

Further, display devices may be configured to include high resolution capabilities such that bright and clear images may be displayed on the display screen. However, high resolution capabilities increase power consumption of the display device. Due to its portability, the display device may be unable to be frequently charged. Moreover, there are limitations with incorporating a high-capacity battery into a display device such as the size of the display device, availability of battery materials, etc.

Display devices may use various types of display screens such as a self-luminous display or a transmissive display. For example, a portable display device may use a self-luminous display, such as a plasma display panel (PDP) or an organic light emitting diode (OLED) or a transmissive display such as a liquid crystal display (LCD). Self-luminous displays provide improved picture quality in comparison to transmissive displays.

Transmissive displays consume a constant power regardless of the luminance of a displayed image, whereas the self-luminous display consumes power in proportion to the light strength (luminance) of the image displayed on the screen. That is, self-luminous displays only consume power when content, such as a web page or an e-book, is displayed on the display screen. Therefore, a portable display device having a self-luminous display consumes less power than a portable display device having a transmissive display. Therefore, a self-luminous display may require low power consumption to achieve a stable power supply.

One way that a display device may reduce battery consumption is by operating in a reduced luminance mode (e.g., dimming mode). For example, in order to reduce the power consumption, a display device can monitor a battery level and reduce the luminance of the entire display screen when the battery level is determined to be below a predetermined level with respect to the total battery capacity. However, when the battery level is equal to or above the predetermined level, no alternative operating methods are implemented to reduce battery consumption.

Accordingly, there a need exists for a method and device for reducing power consumption of a display screen by modifying the luminance of the display screen. A method and device for reducing power consumption of the display screen based on content displayed on the display screen would be particularly useful.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device and a method for controlling the same, which can reduce power consumption of a display screen.

In accordance with an aspect of the present disclosure, a display device is provided. The display device includes a display configured to display content on a screen and a processor configured to determine a region of the screen corresponding to an interest of a user in the content displayed on the screen and display a masking element over a portion of the content displayed on the screen based on the region of the screen determined to correspond to the interest of the user. The masking element may be displayed at a luminance level equal to or less than a luminance level associated with the content displayed on the display.

The masking element may be displayed over a region of the screen different from the region of the screen determined to correspond to the interest of the user.

The region of the screen corresponding to the interest of the user may be determined to be less than the entire screen.

The processor may be further configured to modify a size, a shape, or a position of the masking element in response to receiving a masking element modification indication from the user.

The masking element may have an opacity level different from an opacity level of the content displayed on the screen.

The masking element may include at least one of an image, one or more alphanumeric characters, and one or more symbols.

The image may include at least one of a graphic generated based on the content, a predetermined graphic, and an application execution screen.

The display device according to the aspect of the present disclosure may further include a camera configured to capture an image, wherein the processor is further configured to determine the region of the screen corresponding to the interest of the user based on the image captured by the camera.

The processor may be further configured to determine a position within the screen to display the masking element prior to content being loaded on the screen, simultaneously with the content being loaded on the screen, or after the content is displayed on the screen.

The region of the screen corresponding to the interest of the user is determined prior to content being loaded on the screen, simultaneously with the content being loaded on the screen, or after the content is displayed on the screen.

The region of the screen corresponding to the interest of the user is determined prior to content being loaded on the screen, simultaneously with the content being loaded on the screen, or after the content is displayed on the screen.

The content may include first content information and second content information different from the first content information, and the region of the screen corresponding to the interest of the user may be determined based on the first content information and the second content information.

The first content information may be associated with a first content update time and the second content information may be associated with a second content update time different from the first content update time, and the region of the screen corresponding to the interest of the user may be determined based on the first content information, the second content information, the first content update time, and the second content update time.

The first content information may be associated with a first message and the second content information is associated with a second message, the region of the screen corresponding to the interest of the user may be determined based on the first message and the second message, and the masking element may be displayed over the second message.

The masking element includes information stored in a short-term data storage element of the display device.

The processor may be further configured to duplicate information associated with the content displayed on the screen, where the masking element may include the duplicated information associated with the content displayed on the screen and stored in the short-term data storage element of the display device.

The processor may be further configured to detect a current battery level of a battery of the display device, compare the current battery level with a total battery capacity associated with the battery of the display device, and determine a size, a shape, or a position of the masking element based on the current battery level and the total battery capacity associated with the battery.

In accordance with another aspect of the present disclosure, a method for controlling a display device is provided. The method includes determining a region of a display screen of the display device corresponding to an interest of a user in content displayed on the display screen and displaying a masking element over a portion of the content displayed on the display screen based on the region of the screen determined to correspond to the interest of the user, where the masking element is displayed at a luminance level equal to or less than a luminance level associated with the content displayed on the display screen.

The masking element may be displayed over a region of the display screen different from the region of the display screen different from the region of the screen determined to correspond to the interest of the user.

The region of the screen corresponding to the interest of the user may be determined to be less than the entire display screen.

The method may further include receiving a position modification indication, where the position modification indication may include information associated with a received input from the user indicating a modification in a position of the masking element and displaying the masking element in a different position on the display screen based on the position modification indication.

The method may further include receiving a position modification indication, where the position modification indication may include information associated with a received input from the user indicating a modification in a position of the masking element and displaying the masking element in a different position on the display screen based on the position modification indication.

The method may further include receiving a position modification indication, where the position modification indication may include information associated with a received input from the user indicating a modification in a position of the masking element and displaying the masking element in a different position on the display screen based on the position modification indication.

The masking element may have an opacity level different from an opacity level of the content displayed on the display screen.

The masking element may include at least one of an image, one or more alphanumeric characters, and one or more symbols.

The image may include at least one of a graphic generated based on the content, a predetermined graphic, and an application execution screen.

The method may further include capturing an image with a camera of the display device and determining the region of the display screen corresponding to the interest of the user based on the image captured by the camera.

The method may further include determining a position within the screen to display the masking element prior to content being loaded on the display screen, simultaneously with the content being loaded on the display screen, or after the content is displayed on the display screen.

The region of the display screen corresponding to the interest of the user may be determined prior to content being loaded on the display screen, simultaneously with the content being loaded on the display screen, or after the content is displayed on the display screen.

The content may further include first content information and second content information different from the first content information and the region of the screen corresponding to the interest of the user may be determined based on the first content information and the second content information.

The first content information may be associated with a first content update time and the second content information may be associated with a second content update time different from the first content update time.

The first content information may be associated with a first message and the second content information may be associated with a second message, the region of the display screen corresponding to the interest of the user may be determined based on the first message and the second message, and the masking element may be displayed over the second message.

The masking element may include information stored in a short-term data storage element of the display device.

The method may further include duplicating information associated with the content displayed on the screen, where the masking element includes the duplicated information associated with the content displayed on the display screen and stored in the short-term data storage element of the display device.

The method may further include detecting a current battery level of a battery of the display device, comparing the current battery level with a total battery capacity associated with the battery of the display device, and determining a size, a shape, or a position of the masking element based on the current battery level and the total battery capacity associated with the battery.

In accordance with yet another aspect of the present disclosure, a display device is provided. The display device may include a display having a screen and a processor configured to control the display such that a first portion of the screen has a first luminance level and a second portion of the screen has a second luminance level different from the first luminance level.

The first luminance level may be greater than the second luminance level.

The processor may be further configured to identify the first portion of the screen based on content displayed on the screen.

The display device may further include an image capturing device configured to capture an image, where the first portion of the screen is identified based on the image captured by the image capturing device.

The processor may be further configured to control the display such that a third portion of the screen has the second luminance level.

The third portion of the screen may be spaced apart from the second portion of the screen.

As described above, according to various embodiments of the present disclosure, the power consumption of the display screen can be reduced by appropriately adjusting the luminance of the display device so as to minimize the disturbance of the user's content viewing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 illustrates a masking element according to an embodiment of the present disclosure;

FIGS. 9, 10, 11A, 11B, 11C, and 11D illustrate screens on which masking elements are displayed while content is being loaded according to various embodiments of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
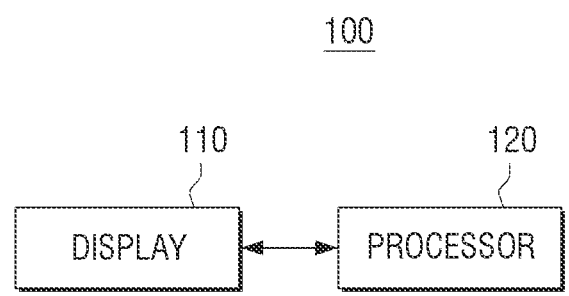
FIG. 1 is a block diagram schematically illustrating the configuration of a display device according to an embodiment of the present disclosure.

FIG. 1 is a block diagram schematically illustrating the configuration of a display device according to an embodiment of the present disclosure.

In the present disclosure, a display device 100 may be implemented by various display devices having displays, such as a smart phone, a tablet personal computer (PC), a portable multimedia player (PMP), a moving picture experts group (MPEG)-1 or MPEG-2 audio layer III (MP3) player, and a navigation device.

In the present disclosure, explanation will be made on the assumption that the display device 100 is implemented by a smart phone, but is not limited thereto. The display device may be implemented by various display devices including the above-described devices. In addition, the display device may be any portable device configured to receive content over a wired or wireless network.

Referring to FIG. 1, a display device 100 according to an embodiment of the present disclosure includes a display 110 and a processor 120. It is noted that FIG. 1 omits additional device elements associated with display device 100 for clarity and ease of description purposes. Display device 100 may further include additional device elements such as an image capturing element, a storage element, an audio transmission element, a communication network transceiver, etc.

The display 110 is configured to display content on a display screen. In particular, a masking element may be displayed over at least a portion of the content displayed on the display screen under the control of the processor 120.

The display 110 may be a liquid crystal display (LCD), an organic light emitting diode (OLED), a transparent display, a flexible display, or a combination thereof, but is not limited thereto. Further, the display 110 may further include a driving circuit that may be implemented in the form of an amorphous silicon (a-si) thin-film transistor (TFT), a low temperature poly silicon (LTSP) TFT, or an organic TFT (OTFT), and a backlight unit.

The processor 120 is configured to control the operation of the display device 100. For example, the processor 120 may be configured to control the entire operation of the display device 100.

In an exemplary embodiment, the processor 120 may determine a region of the display screen corresponding to an interest of the user in the content displayed on the screen and display a masking element over a portion of the content displayed on the screen based on the region of the screen determined to correspond to the interest of the user. The masking element may be displayed at a luminance level equal to or less than a luminance level associated with the content displayed on the screen.

Here, the region of the display screen corresponding to an interest of the user in the content displayed on the screen means a region of the display screen in which a user may desire to view content for a period of time. For example, when content is displayed over the entire display screen, the region corresponding to the interest of the user may be associated with a portion of the display screen in which the user's visual attention is concentrated such as the center of the display screen. In this case, the concentrated partial screen corresponds to the region of the display, less than the entire display screen, in which the user is interested in viewing the content.

The concentrated partial screen may be determined based on a user characteristic. For example, the processor 120 may determine a region of the display screen corresponding to the interest of the user based on an image captured by a camera of the display device where the processor 120 determines the region of the screen in which the user is viewing based on the image of the eye. This will be described in detail later.

Further, the masking element may be a visual object configured to obscure at least a portion of the content displayed on the display screen. The masking element may have a luminance level that is equal to or less than a preset luminance value. In an exemplary embodiment, the present luminance value may be associated with the luminance value in which the content is displayed. That is, the processor 120 may lower the luminance level of the region of the display screen associated with the masking element where the luminance level of the region of the display corresponding to the interest of the user in the content displayed on the display screen remains unchanged. In another exemplary embodiment, the processor 120 may lower the overall luminance level of the display screen before lowering the luminance level of the region of the display screen associated with the masking element where the luminance level of the region of the display screen associated with the masking element is less than the luminance level of the rest of the screen.

Since power consumption of the display screen relates to the luminance level of the screen, the power consumed by the display 110 can be reduced by displaying a masking element on the display screen while minimizing the disturbance of user's content viewing by lowering only the luminance level of the region of the display 110 associated with the masking element.

The masking element may have an opacity level different from the opacity level of the content. For example, masking element may have a predetermined opacity level such that the content provided under the masking element is not as transparent to the user as the content provided in other regions of the display screen not associated with the masking element. The masking element may have varying levels of opacity. For example, the lowest level of opacity may be associated with the greatest amount of transparency with respect to the content opacity level and the highest level of opacity may be completely opaque such that no underlying content may be visible to the user.

In another exemplary embodiment, the masking element may further include at least one of an image, one or more alphanumeric characters, and one or more symbols. When the masking element includes an image, the image may include at least one of a graphic generated based on the content displayed on the display screen, a predetermined graphic, and an application execution screen.

Processor 120 may be further configured to modify a size, a shape, and/or a position of the masking element. For example, processor 120 may modify the size, the shape, and the position of the masking element in response to receiving a masking element modification indication from the user. The modification indication may be generated when a user provides an input modifying the size, shape, and/or position of the masking element. In response, the processor 120 displays the masking element accordingly.

In an exemplary embodiment, when the displayed content is a document including text, the user may read the document, starting from an upper-side region of the document to a lower-side region thereof. As the user moves from the upper side to the lower side, the masking element may be provided over content in which the user desires to read and the user may manually select to modify the size, shape, and/or position of the masking element such that the masking element is provided on another portion of the display screen. Alternatively, the processor 120 may automatically modify the size, shape, and/or position of the masking element based on an image captured by the camera of the display device.

Further, the processor 120 may be configured to display the masking element based on a battery level. For example, the processor 120 may be configured to detect a current battery level of the battery of the display device, compare the current battery level with a total battery capacity associated with the battery of the display, and determine a size, size, shape, and/or position of the masking element based on the current battery level and the total battery capacity. In an exemplary embodiment, when the current battery level is equal to or less than a predetermined threshold level, the processor 120 can determine not to display the masking element. In other words, if the battery capacity is sufficient, the masking element may be set not to be displayed, and thus the power can be efficiently preserved in accordance with the battery state.

In another exemplary embodiment, the opacity level of the masking element may vary with the battery level of the display device where one or more battery level thresholds can be defined such that the level of opacity is based on the current battery level. For example, when a total battery capacity is equal to 100%, a first threshold may be defined between 100-75% battery capacity, a second threshold may be defined between 74-50% battery capacity, and a third threshold defined between 49-25% battery capacity. When the current battery level is determined to be within the first threshold, the processor 120 may display the masking element at a first opacity level. When the current battery level is within the second threshold, the processor 120 may display the masking element at a second opacity level greater than the first opacity level and when the current battery level is within the third threshold, the processor 120 may display the masking element at a third opacity level greater than the second opacity level such that the third opacity level has a luminance level less than the first and second opacity levels. In other words, the luminance level of the masking element is reduced such that the masking element appears darker to a user as the battery level is reduced.

In general, the processor 120 may detect the current battery level and total battery capacity by measuring a voltage or a current associated with the battery. Since the output voltage of the batter is reduced based on the operation time of the display device 100, the processor 120 may periodically measure the battery level using the characteristics of the battery as described above.

FIG. 2 illustrates a masking element according to an embodiment of the present disclosure.

Referring to FIG. 2, a region on which content is displayed in the display device 100 according to the present disclosure may be divided into a region of interest 21 that is a region of the screen 110 corresponding to an interest of a user and a masking element 22 that is a remaining region of which the luminance is lowered. The user may view a part of the content through the region of interest 21, and a masking element 22 may be displayed on the remaining region of the screen 110 such that the user does not view content through the masking element 22.

Hereinafter, explanation will be made on the assumption that a display 110 is implemented by a touch display that can receive a touch input through a user's finger, a touch pen, a stylus, etc. However, this is merely for convenience in explanation, the scope of the present disclosure is not limited thereto. It is apparent that all display devices can receive an input through a keyboard, a button, or a mouse may be included in the technical concept of the present disclosure.

If the user intends to view the content that is displayed under the masking element 22 in addition to the content that is displayed on the region of interest 21, i.e., the content that the masking element overlaps, the user may pull the content that is displayed under the masking element 22 up to the region of interest 21 using a scroll bar. In this case, since the masking element 22 has been fixed, the user may move only the content that is hidden by the masking element to the region of interest 21 through scrolling the scroll bar.

On the other hand, the size, the shape, the position of the masking element 22, and/or the number of masking elements displayed on the screen 110 may be variously modified. For example, the size of the masking element 22 may be modified in accordance with the size of the region on which the content is displayed, or may be adjusted by the user.

Further, the position of the masking element 22 may be variously modified by the user. For example, referring to FIG. 2, if the user touches and drags the masking element 22 22 upward, the masking element 22 may be moved to the region of interest 21 in a state where the size of the masking element 22 is not changed. Further, the size of the masking element 22 may be extended into the region of interest 21 thereby reducing the size of the region of interest 21 and increasing the size of the masking element 22.

Figure 3A:
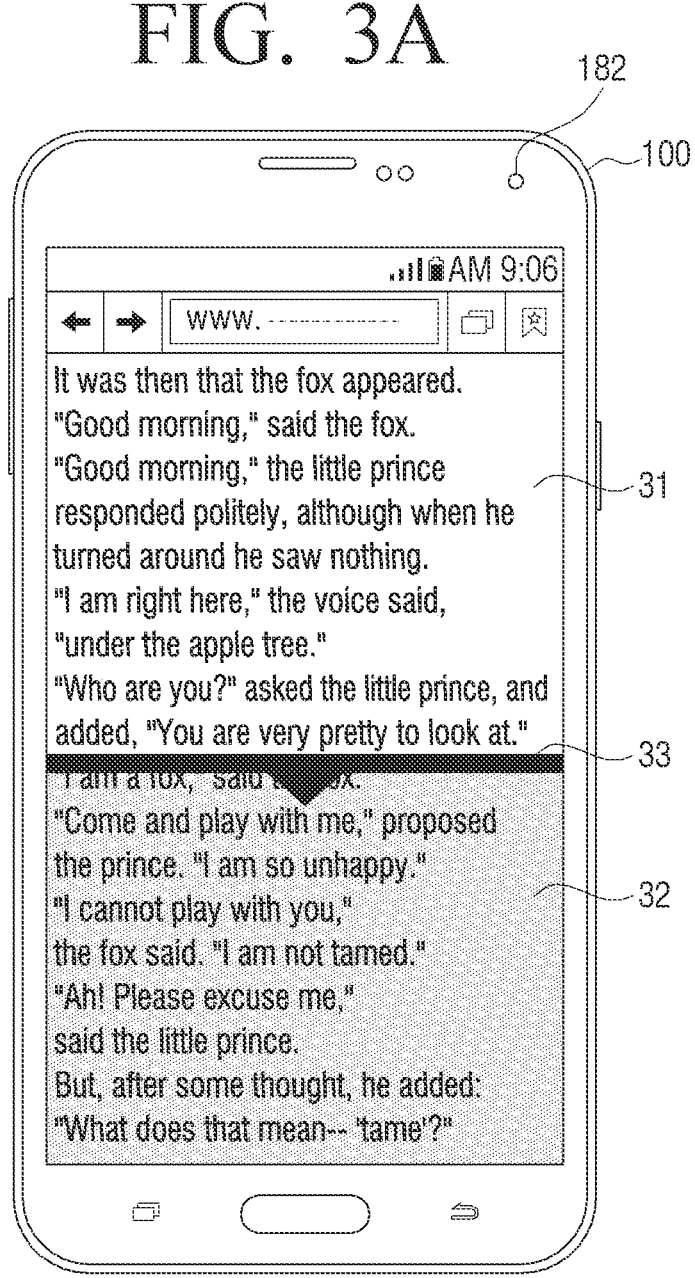
FIGS. 3A, 3B, and 4 illustrate a method for displaying masking elements according to various embodiments of the present disclosure.
Figure 3B:
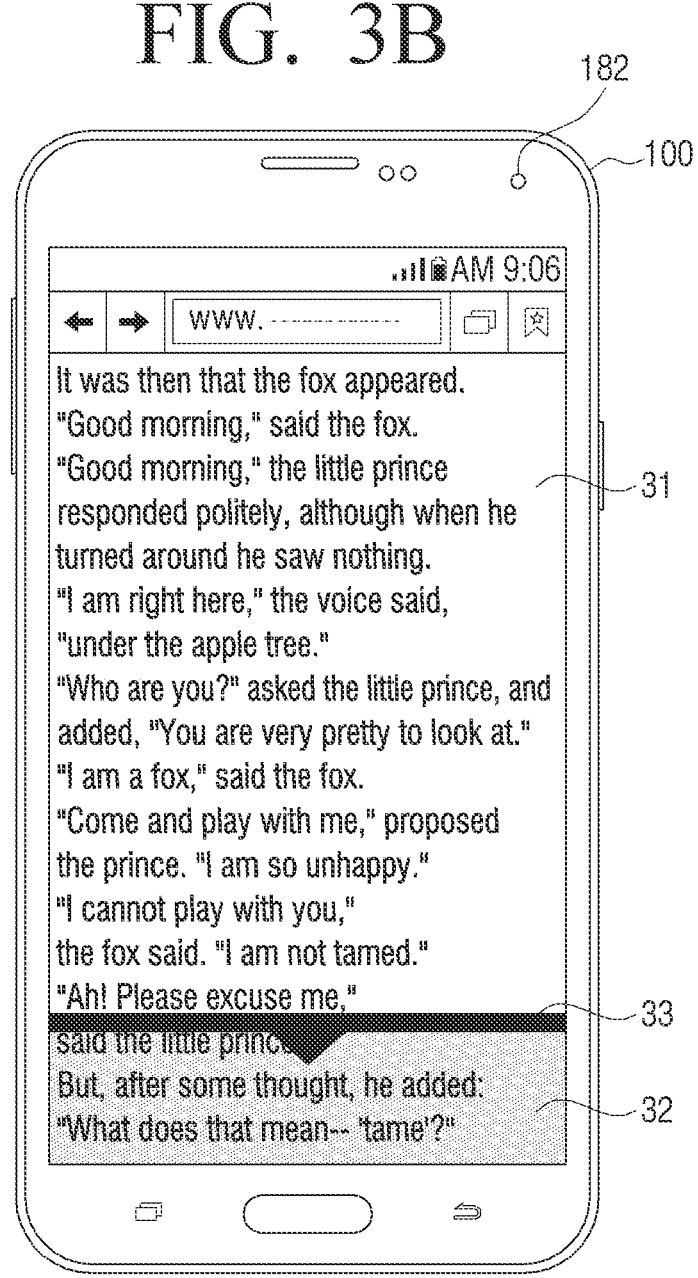
Figure 4:
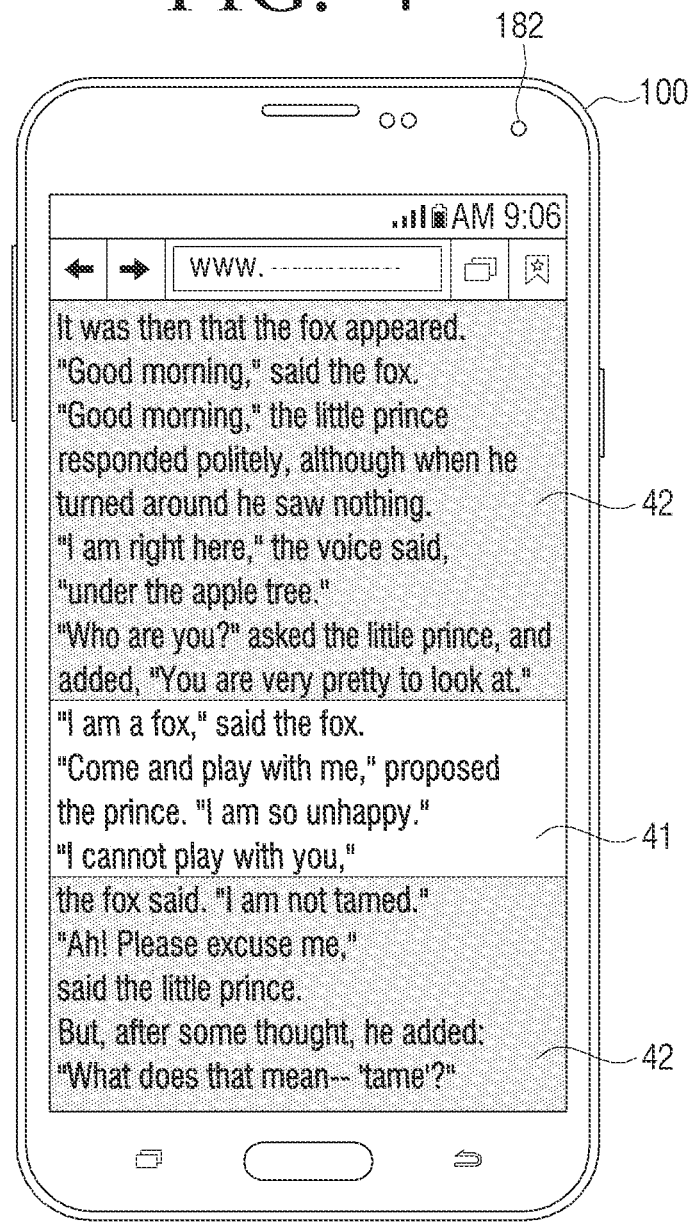

FIGS. 3A, 3B, and 4 illustrate a method for displaying a masking element according to various embodiments of the present disclosure.

FIG. 3A illustrates a screen on which a document that is included in a web page is displayed.

Referring to FIG. 3A, a content screen that provides a document screen may include the region of the screen corresponding to an interest of the user 31 where masking element 32 is provided over the content screen. Here, since the masking element provides a preset opacity, it may provide a preset visibility to the content displayed under the masking element. That is, the masking element 32 has luminance level less than the luminance level of region 31 of the display.

Further, as illustrated in FIGS. 3A to 4, the region 31 includes content displayed on an upper side of an adjustment bar 33. In this case, the region 31 may be set to be positioned on the upper side of the adjustment bar 33, and the masking element 32 may be set to be positioned on a lower side of the adjustment bar 33. However, in contrast, the region 31 associated with content may be set to be positioned on the lower side of the adjustment bar 33, and the masking element 32 may be set to be positioned on the upper side of the adjustment bar 33.

The display device 100 may extract the region that is displayed on the upper side of the adjustment bar 33 as the region 31 corresponding to an interest of the user, and display the masking element 32 over a portion of the content displayed on the screen where the masking element 32 is displayed at a luminance level equal to or less than a luminance level associated within region 31. In an exemplary embodiment, the luminance level associated with the masking element 32 may be adjusted by the user. Alternatively, the luminance level may be predetermined and stored at the display device 100.

Further, the display device 100 may further include a camera 182 where the region of the screen corresponding to the interest of the user may be determined based on an image captured by the camera 182. Specifically, the processor 120 may determine the region of the screen corresponding to the interest of the user based on that portion of the screen in which the user looks at based on a user characteristic such as the user's eye that is sensed by the provided camera 182.

In an exemplary embodiment, a pupil tracking technology may be implemented to determine the region of the screen corresponding to the interest of the user based on the user characteristic. For example, the display device 100 may extract a face region using various characteristics such as skin color and/or facial features (e.g., eyes, nose, lips, etc.) from an image captured by the camera 182. A pupil region may be extracted from the image using the structural characteristics of a face, and eye movements may be tracked by capturing movements of the pupil (e.g., sensing of motion of the eye in an upper direction, a lower direction, a left direction and/or right direction). The image captured by the camera 182 used to determine the region of the screen corresponding to the interest of the user may be a single image or may be a plurality of images captured over a period of time. For example, when a plurality of images is captured, the images may be directly sequential such that every image captured over a period of time is used to determine the region of the screen corresponding to the interest of the user. Alternatively, a single image may be captured periodically where all of the separate images are then used to determine the region of the screen corresponding to the interest of the user.

After the region of the screen corresponding to the interest of the user is determined, as illustrated in FIG. 3A, the display device 100 displays a masking element 32 over a portion of the screen that is not considered to correspond to the interest of the user where the masking element is displayed at a luminance level equal to or less than a luminance level associated with the region of the screen corresponding to the interest of the user 31.

Alternatively, as illustrated in FIG. 3B, the user may see a document that is included in a web page through the region of interest 31, and in the case where the user intends to see the document that is displayed under the masking element 32 that is on the lower side of the adjustment bar 33, the user may reduce the size of the masking element 32 through pull-down of the adjustment bar 33.

Referring to FIG. 3B, the user may form an optimum content viewing environment that suits the user through appropriate adjustment of the sizes of the region of interest 31 and the masking element 32 using the adjustment bar 33.

The masking element 32 may be fixed, and in the case where the user intends to view the content that is displayed under the masking element 32 that is on the lower side of the adjustment bar 33 using the scroll bar, the user may pull the content that is displayed under the masking region 32 up to the region 31 by touching and dragging the region 31. Accordingly, the user can optimize the size of the region 31 on which the content can be viewed to suit the user, and reduce the luminance of the remaining region except for the region 31 to reduce power consumption.

The power consumption reduction effect that is obtained by displaying a masking element over a portion of the screen as shown in FIG. 3A is described in Tables 1 and 2 below.

TABLE 1

| Exp. 1 | Average power consumption for 5 sec | Trial 1 | Trial 2 | Trial 3 | Average |
| --- | --- | --- | --- | --- | --- |
| General content screen | Average power consumption (mW) | 1338.79 | 1355.34 | 1318.46 | 1337.53 |
| | Average current consumption (mA) | 362.49 | 366.97 | 356.98 | 362.147 |

TABLE 2

| Exp. 2 | Average power consumption for 5 sec | Trial 1 | Trial 2 | Trial 3 | Average |
| --- | --- | --- | --- | --- | --- |
| Content screen including a masking element | Average power consumption (mW) | 1323.06 | 1238.99 | 1242.71 | 1268.253 |
| | Average current consumption (mA) | 358.23 | 335.47 | 336.47 | 343.39 |

FIG. 4 illustrates a method for displaying a plurality of masking elements according to an embodiment of the present disclosure.

Referring to FIG. 4, a plurality of masking elements 42 are displayed may be provided on the screen on which content is displayed. As illustrated in FIG. 4, masking elements 42 are displayed above and below the region corresponding to an interest of a user 41.

Region 41 may be positioned in the center of the content. Accordingly, the user can view the content through the region 41 that is positioned in the center of the content. In this case, since the masking elements 42 have a preset opacity so that the content that is displayed under the masking regions 42 provide a preset reduced visibility, the user can view the content even through the masking elements 42. However, the luminance level of the content that is displayed under the masking elements 42 may be relatively lower than the luminance level of the region 41 thereby masking content from the user that is provided under the masking elements 42.

The size of the region 41 may be further decreased and the masking elements 42 may be further increased to reduce power consumption.

Each masking element 42 may be fixed where the user may pull up or pull down the content that is displayed under the masking regions 42 to the region 41 by touching and dragging the content within the region 41 upward or downward. In this case, the content that is displayed within the region 41 is moved to under the masking regions 42.

Figures 5A, 5B, 5C:
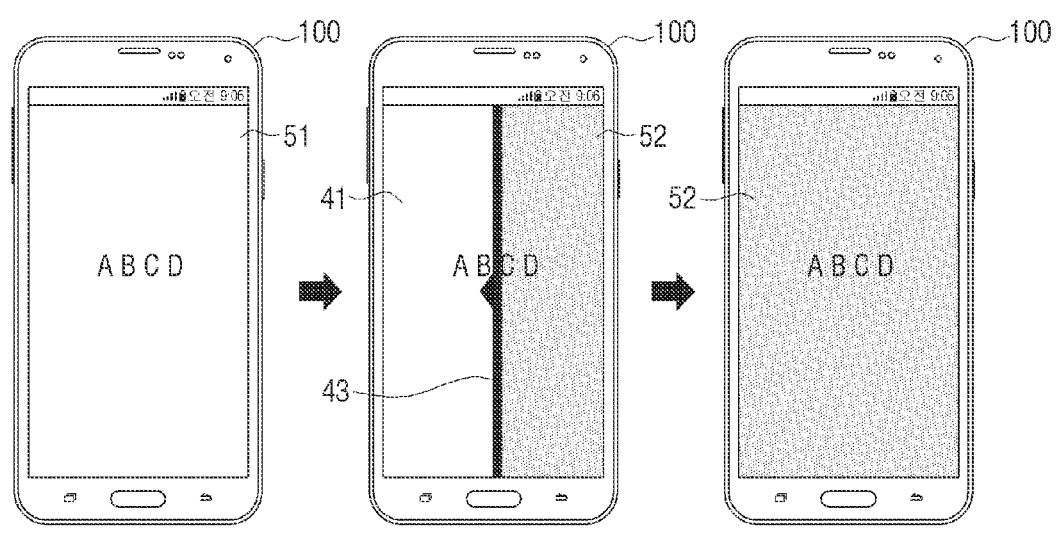
FIGS. 5A, 5B, and 5C illustrate a method for changing a size or a position of a masking element according to various embodiments of the present disclosure.

FIGS. 5A, 5B, and 5C illustrate a method for changing a size or a position of a masking element according to various embodiments of the present disclosure.

Referring to FIGS. 5A to 5C, content 51 that is displayed on the display 110 may be divided into a region 41 and a masking element 52 in a vertical direction, and in accordance with a user's operation, the position and the size of a masking image can be adjusted.

For example, on a screen on which the content "ABCD" 51 is displayed as shown in FIG. 5A, a user may provide touch and drag inputs from right to left, and thus the masking element 52 may appear on the right side of the display 110 as shown in FIG. 5B. In this case, the user may operate an adjustment bar 43 left and right to adjust the size of the masking element that is displayed over the content image. If the user touches and drags the adjustment bar 43 to the end of the left side, the masking element 52 overlaps the entire screen on which the content 51 is displayed as shown in FIG. 5C.

Further, even if the masking element 52 is displayed on the entire screen on which the content 51 is displayed, the masking element has an opacity level such that the content that is displayed under the masking element 52 penetrates the masking element to provide the preset visibility, and thus the user can view the content 51 with a low luminance even in the state as shown in FIG. 5C.

Alternatively, unlike the embodiment of the present disclosure as shown in FIGS. 5A to 5C, the user may adjust the sizes of the region 41 and the masking element 52 through operating the adjustment bar 43 when the content is displayed in a horizontal direction of the display device 100.

FIGS. 6A, 6B, 7, and 8 illustrate a method for displaying a masking element according to various embodiments of the present disclosure.

A masking element may include a predetermined graphic. The predetermined graphic may be implemented by a static or a dynamic image. For example, a static image may include a geometrical figure, a picture, and a photo. A dynamic image may include a moving image. The predetermined graphic masking element may have a luminance level that is equal to or lower than a preset luminance value, and the content image may be pre-stored in the display device 100 or may be received through communication with an external server.

Figure 6A:
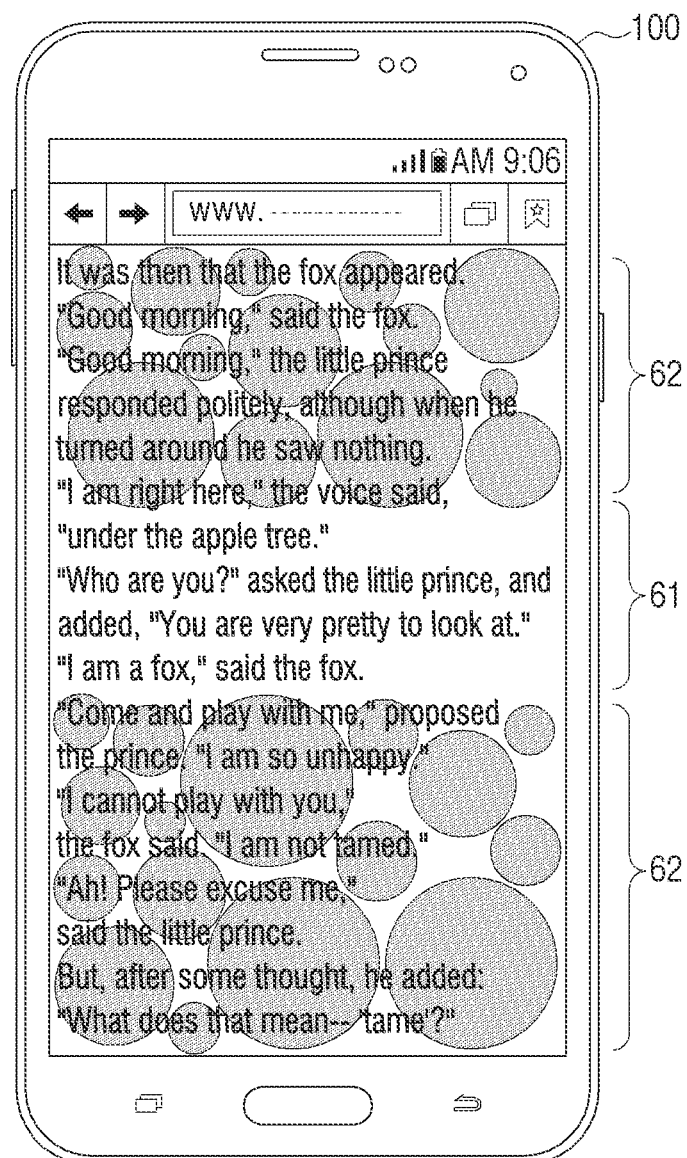
FIGS. 6A, 6B, 7, and 8 illustrate method for displaying a masking element according to various embodiments of the present disclosure.

In an embodiment of the present disclosure as illustrated in FIG. 6A, the predetermined graphic 62 may be implemented by a static image in a water drop shape having the luminance level that is equal to or lower than the preset luminance value, and a plurality of predetermined graphics 62 may be displayed. Further, the static images in the water drop shapes may have different sizes. Region 61 corresponding to an interest of the user may be positioned in the center of the content screen, and the masking elements 62 may be regions that are positioned on the upper side and the lower side of the region 61.

The user may view the content through the region 61 and may pull up or pull down the content that is displayed under the masking elements 62 into the region 61. In this case, it is preferable that the masking elements be fixed regardless of the capability of scrolling the content.

Alternatively, in the case where the user intends to view the content that is displayed under the masking elements 62, the user may directly move the masking element to another region in addition to the scrolling through touching and dragging the masking elements 62. In this case, the masking elements 62 may return to their original positions after staying on the other region for a predetermined time, or may be maintained on the other region.

Further, the position of the masking elements 62 may be moved in accordance with the arrangement state of the display device 100. The display device 100 may include an acceleration sensor or a gyro sensor, and determine the arrangement state of the display device 100 and the change thereof through the acceleration sensor or the gyro sensor. Accordingly, the display device 100 may be implemented so that the position of the masking elements 62 is moved in a direction related to gravity.

Figure 6B:
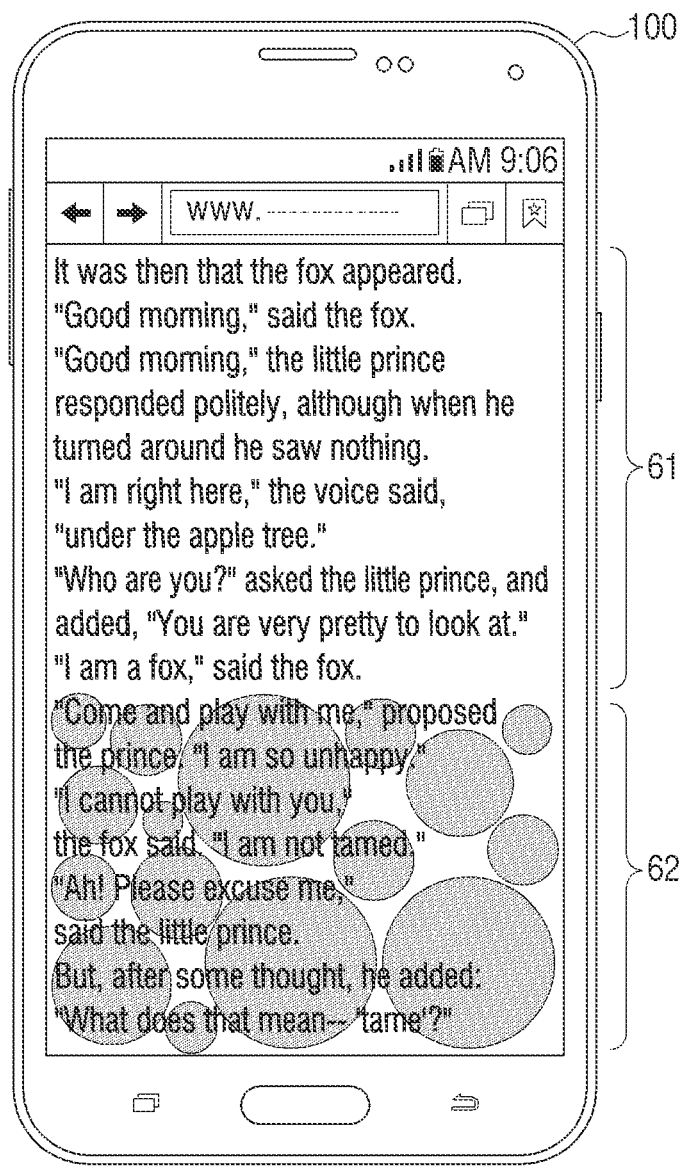

Further, referring to FIG. 6B, a plurality of masking elements 62 in water drop shapes may be displayed only on a lower end portion of the content screen.

Figure 7:
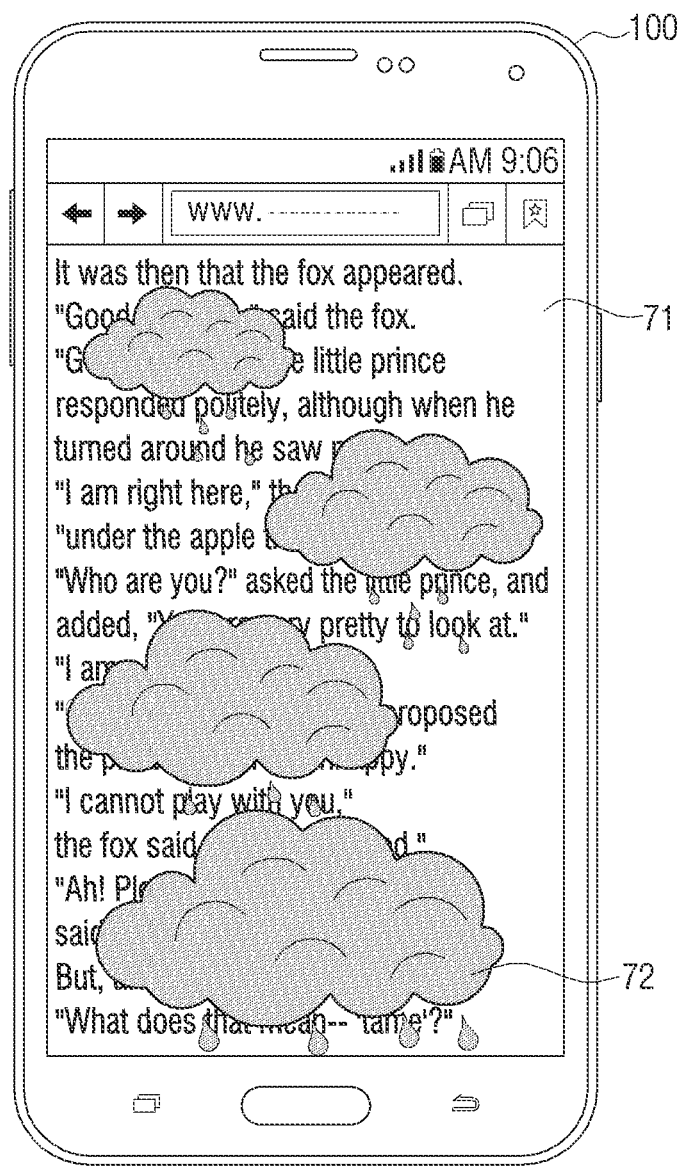

On the other hand, referring to FIG. 7, the masking element may be a graphic generated based on the content. The graphic may be a static image or a dynamic image that indicates the current weather state when the content is associated with the weather. For example, if the current weather is very cloudy and rainy, the display device 100 may receive weather information from a server connected thereto and operate to display a masking element 72 that is implemented by a plurality of static/dynamic images indicating rain clouds on the content screen on the basis of the received weather information.

In this case, the masking element 72 that indicates rain clouds may have a preset opacity level, and the size and/or shape of the masking element 72 may be pre-stored in the display device 100 or may be received from an external server together with the weather information. If the current weather is balmy and fine, the masking element 72 may be a graphic that indicates white clouds or bright sun.

Further, the user may move the masking element 72 to another region by touching and dragging the masking element 72. Accordingly, the user can view the content region that is hidden by the masking element 72 that overlaps the content region.

That is, according to an embodiment of FIG. 7, the user can recognize the current weather information from the masking element 72 and the power consumption can be reduced through lowering of the luminance level of the region of the screen that is hidden by the masking element 72.

Figure 8:
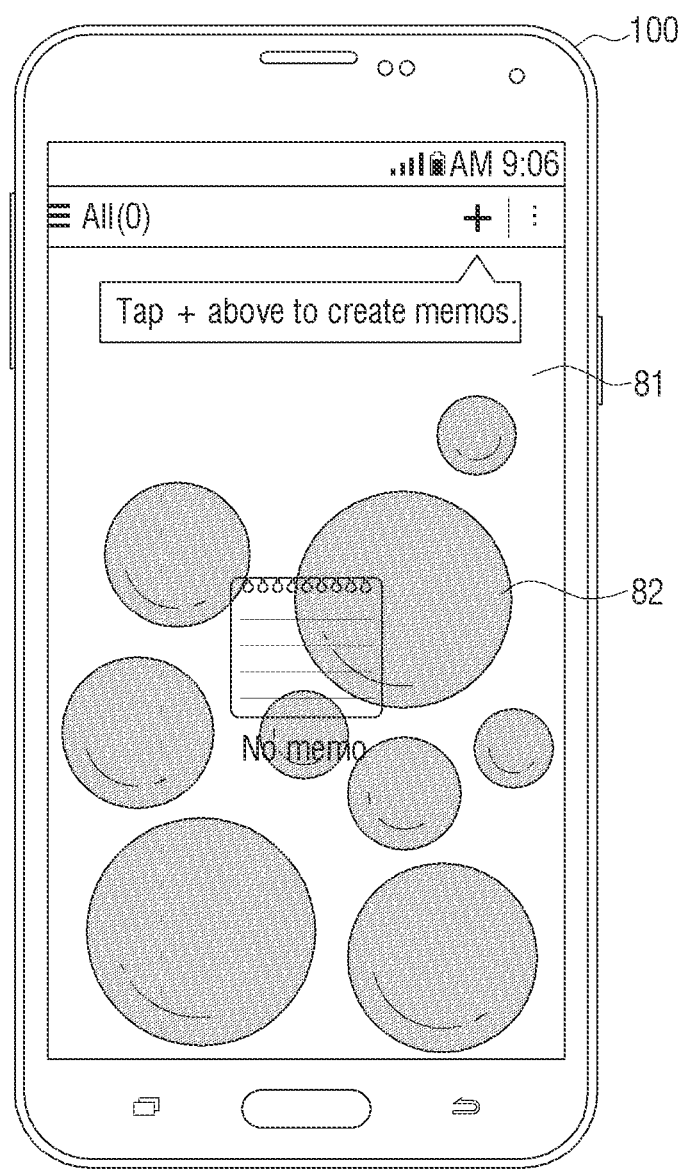

FIG. 8 illustrates a masking element 82 that is displayed over an application screen while application content is executed on the display device 100.

That is, referring to FIG. 8, the masking element 82 may be displayed over the application screen 81. Here, the masking element 82 may be graphic associated with water drop shapes. However, the masking element 82 is not limited thereto, but may include various shapes including a square and a rectangle.

For example, if an input is not made for a preset time, the display device 100 may display the masking element 82 having the water drop shapes on the application screen as illustrated in FIG. 8. Further, while a memo application is executed, the display device 100 may display one masking element 82 or a plurality of masking elements 82 even in the case where no memo is stored.

Masking elements 82 have a luminance level that is equal to or lower than a preset luminance level corresponding to content displayed on the screen.

FIGS. 9, 10, 11A, 11B, 11C, and 11D illustrate screens on which masking elements are displayed while content is being loaded according to various embodiments of the present disclosure.

Figure 9:
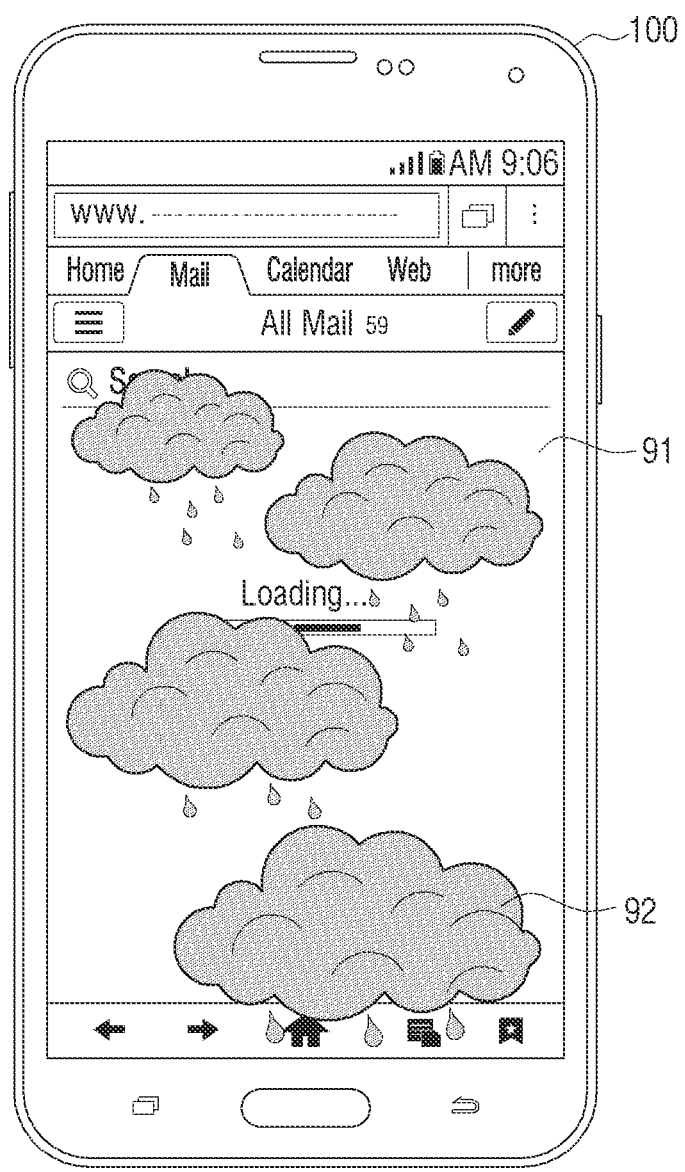

Referring to FIG. 9, a plurality of masking elements 92 that are implemented by static or dynamic images indicating weather may be displayed only while a web page is being loaded.

That is, since web page content is not displayed while the web page is being loaded, it may be assumed that a region of the screen corresponding to an interest of the user does not exist until content is fully loaded and displayed on the screen 91. That is, the processor 120 may sense a state where the content is being loaded on the content screen 91, and in this case, the processor 120 may determine to display a masking element 92 on at least one region of the content screen.

For example, as illustrated in FIG. 9, the display device 100 may sense a state where a web page is being loaded. In this case, the display device 100 may receive weather information from a server while a loading bar that indicates a loading state is being displayed, and display the plurality of masking elements 92 to indicate the weather based on the received information and have a luminance level that is equal to or less than a preset luminance level.

Figure 10:
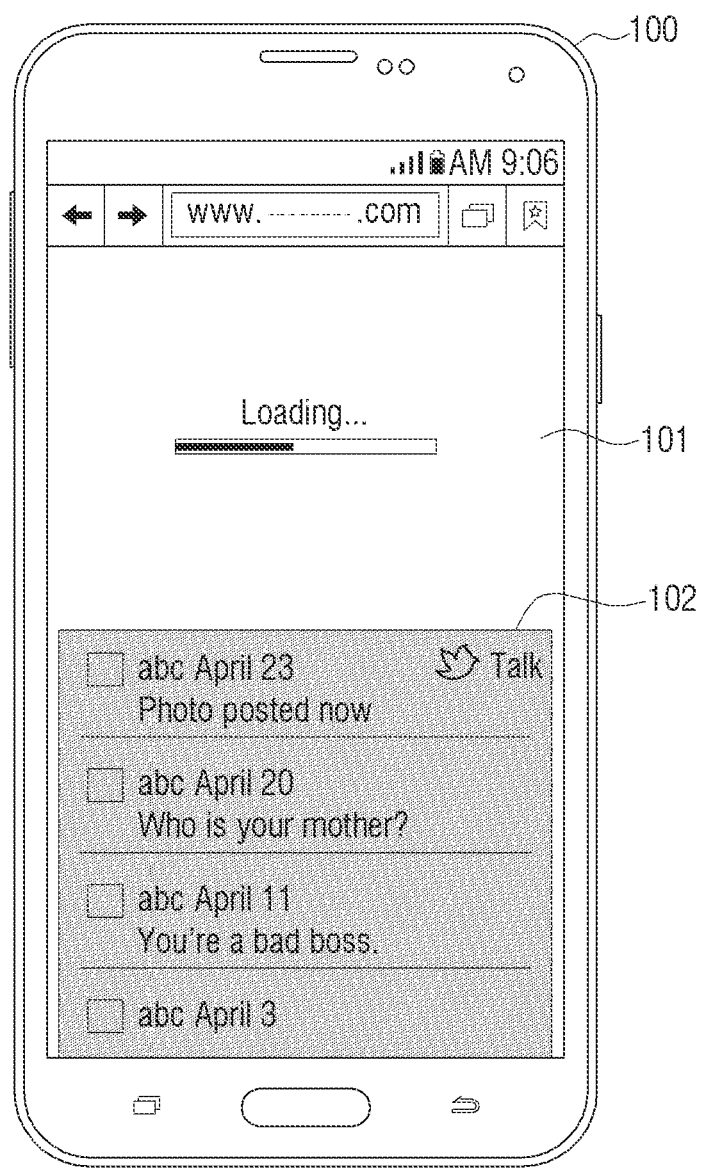

FIG. 10 illustrates a screen on which a social network service (SNS) page associated with a user's account is displayed as a masking element while content is being loaded according to an embodiment of the present disclosure.

In the same manner as in FIG. 9, since content is not displayed while a SNS page is being loaded, a region of the screen corresponding to an interest of the user does not exist until content is fully loaded and displayed on the screen 101.

Referring to FIG. 10, an SNS page 102 having a luminance level that is equal to or less than a preset value is displayed as a masking element, and thus a user can view the SNS page 102 during loading of the web page.

In this case, the display device 100 may pre-store information on a user's corresponding SNS account, and thus automatically log in to the user's SNS account to display the SNS page 102 that includes a posted writing, a photo, or a moving image in the order of their posting.

The user can perform a general task through various operations, such as turning over to a new page through touching the SNS page 102 that is displayed on one region or drawing up a new piece of writing.

Alternatively, the kind of SNS page to be implemented as the masking element 102 may be set by the user, and in addition to the SNS page 102, various web pages, such as a favorite page that the user frequently visits and a user web mail list, may be displayed as a masking element with a luminance level that is equal to or lower than the preset luminance value in accordance with user's setting.

Further, even if loading is completed, the masking element 102 may be maintained as it is while the user operates the SNS page 102, and if a preset time elapses after completion of the loading, the SNS page 102 may be set to disappear such that no masking element is displayed and the content provided in region 101 expands to the entire screen of the device 100.

Further, the user may extend the SNS page 102 or may switch over between region 101 and the masking region 102. For example, if the user performs a preset operation, for example, if the user touches and drags a boundary portion of the masking element 102 in the direction of the region 101, the SNS page 102 may be extended to the entire screen. Further, the positions of the region 101 and the masking element 102 may be switched over to each other. In this case, the SNS page may be displayed on the region 101, and the web page that is being loaded may be displayed as a masking element 102 with a luminance level equal to or less than the preset luminance value.

FIGS. 11A to 11D illustrate various embodiments in which a game screen is displayed on one region of a screen as a masking element while content is being loaded.

Referring to FIGS. 11A to 11D, in the case where a web page is being loaded, display a game screen 112-1 having a luminance that is equal to or less than a preset luminance value on remaining portion of the screen 111.

Figure 11A:
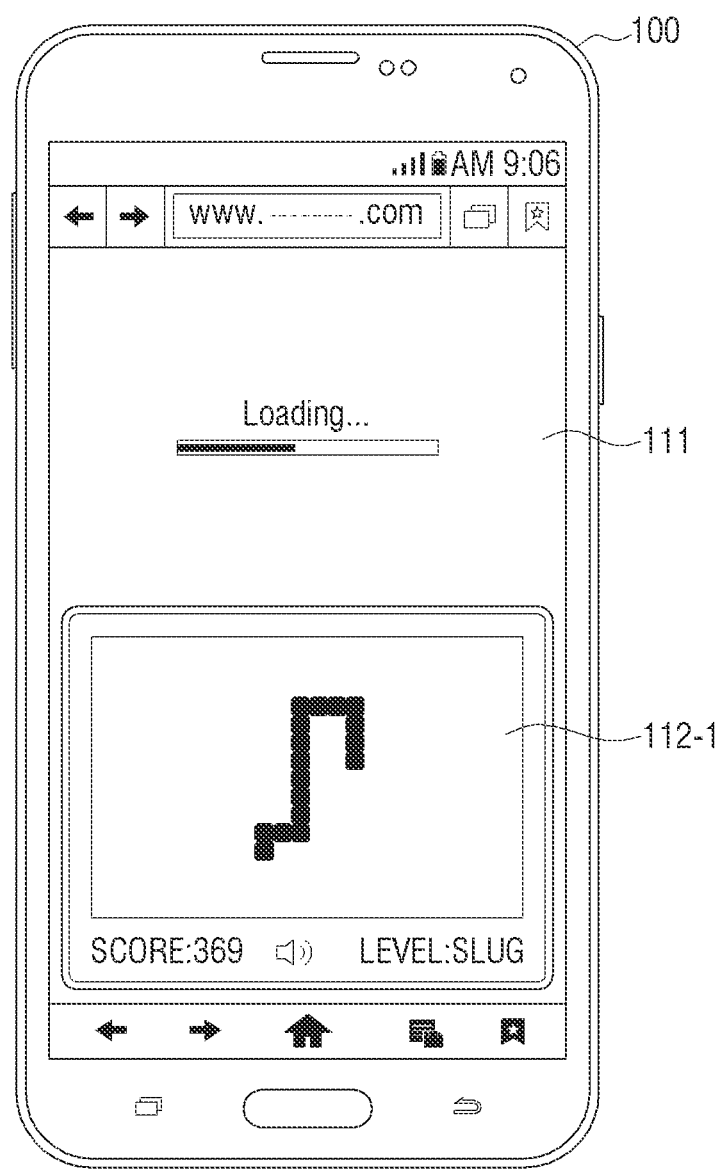
Figure 11B:
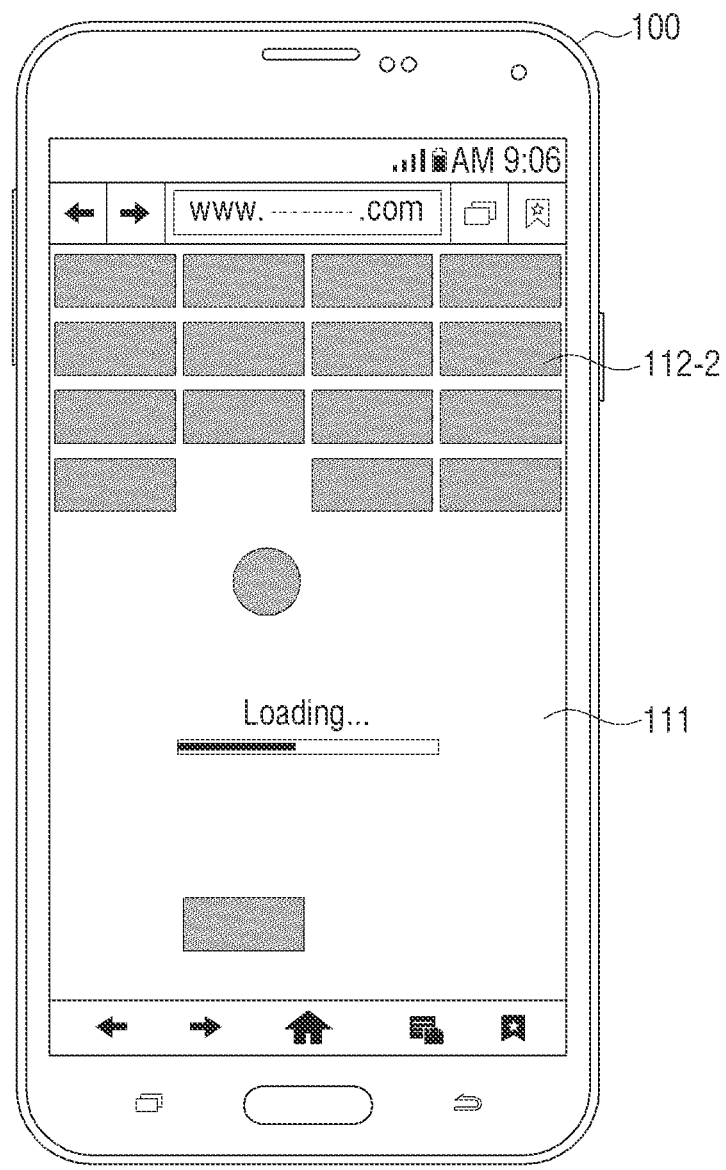
Figure 11D:
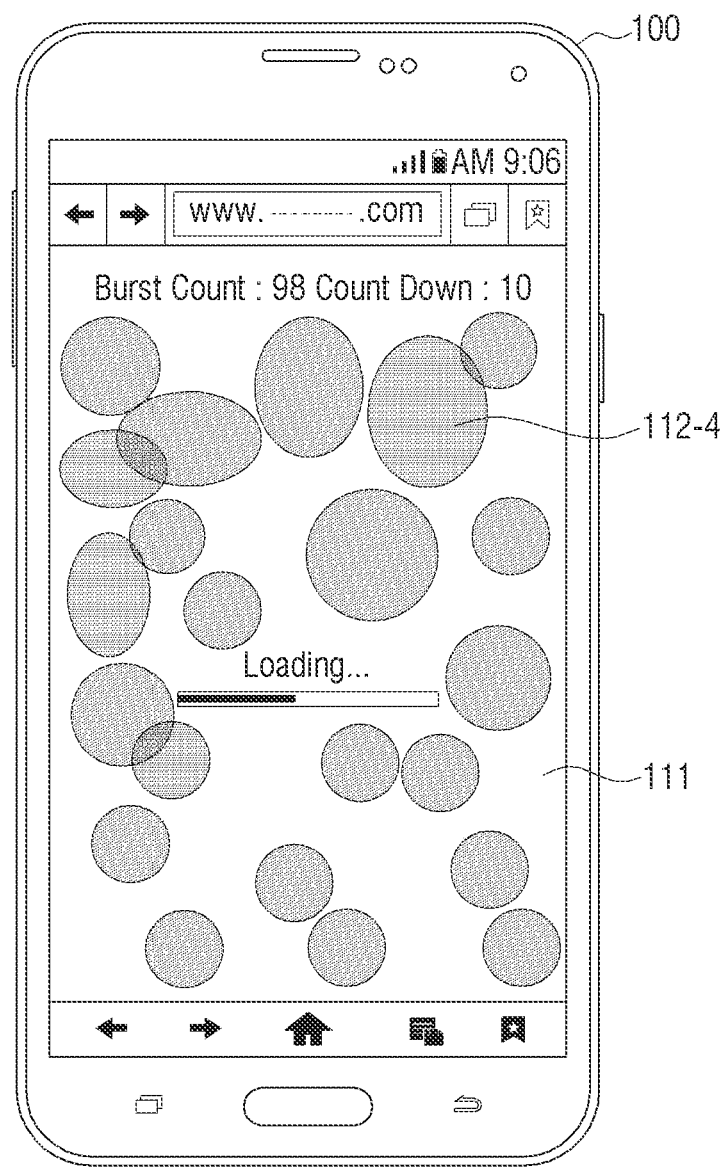

FIG. 11A illustrates an embodiment of the present disclosure in which masking element 112-1 is an execution screen of a Snake game. While the content is being loaded in region 111, a user can enjoy the game by interacting with the execution screen 112-1. FIG. 11B illustrates an embodiment of the present disclosure in which masking element 112-2 is an execution screen of a Breakout game is displayed over region 111 of the display screen. FIG. 11C illustrates an embodiment of the present disclosure in which masking element 112-3 is an execution screen of Tic Tac Toe game is displayed over region 111 of the display screen. FIG. 11D illustrates an embodiment of the present disclosure in which masking element 112-4 is an execution screen of a Bubble burst game is displayed over a region 111 of the display screen.

As illustrated in FIGS. 11A to 11D, while content is being loaded, the display device 100 may display a game screen with a luminance level that is equal to or less than a preset luminance value. Accordingly, the power consumption of the display 110 can be reduced, and a user may feel less bored until the content loading is completed.

Figure 12A:
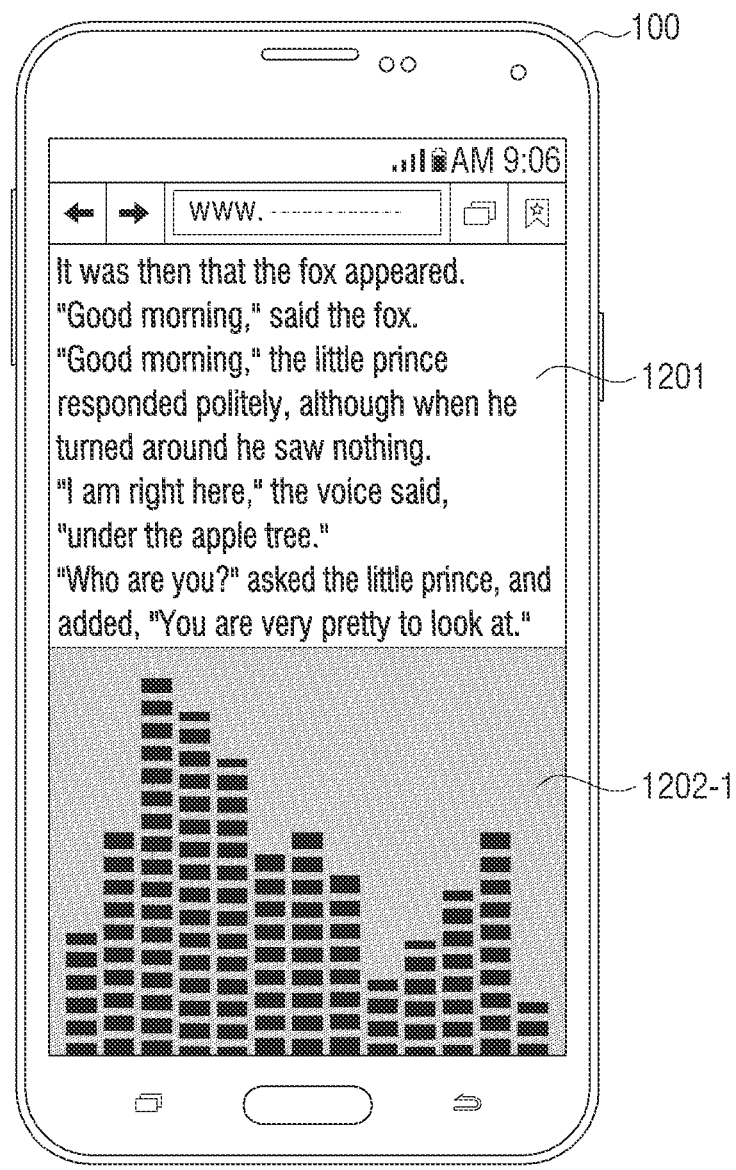
FIGS. 12A and 12B illustrate screens on which graphic equalizers associated with a music function are displayed as masking elements according to an embodiment of the present disclosure.
Figure 12B:
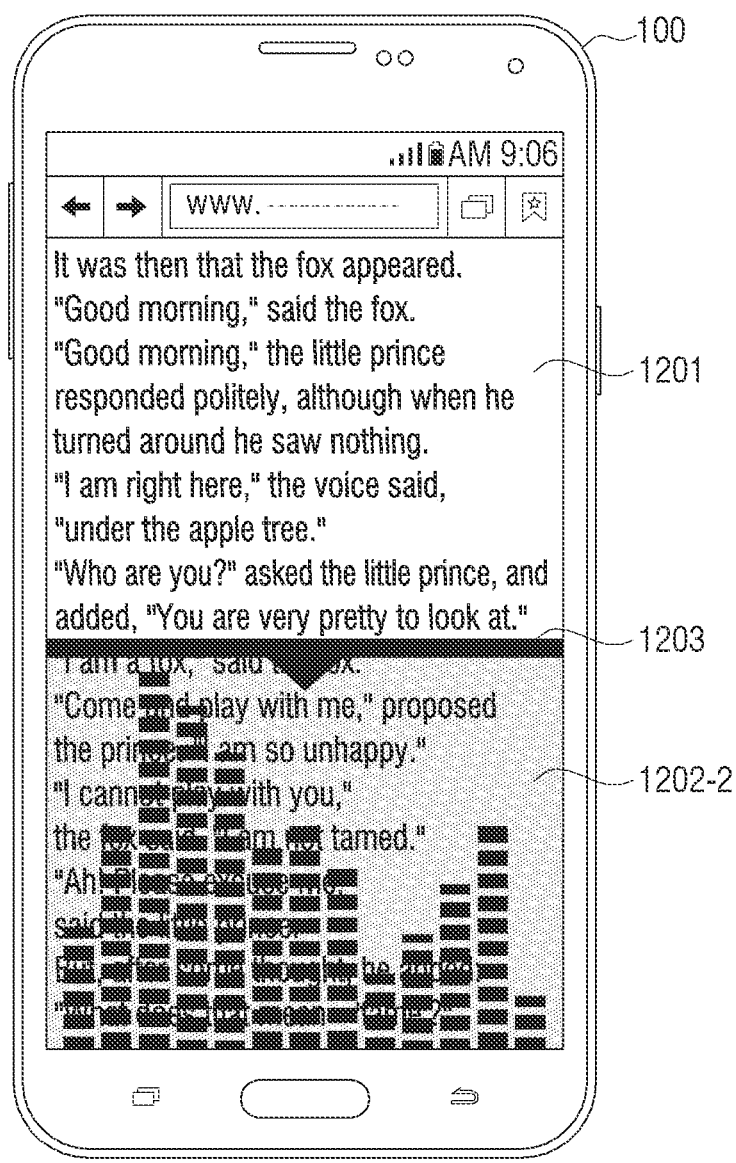

FIGS. 12A and 12B illustrate screens on which graphic equalizers associated with a music function are displayed as masking elements according to an embodiment of the present disclosure.

In the case of a display device 100 that supports multi-tasking, a plurality of pieces of content, such as applications, may be simultaneously executed. In this case, one content execution screen may be displayed within a region corresponding to an interest of a user and a graphic image associated with an execution screen is displayed as a masking element.

For example, referring to FIG. 12A, while a music reproduction application is executed as background in the display device 100 that supports multi-tasking, a user may search for a web page on region 1201 of the display through execution of a web browser application. In this case, masking element 1202-1 includes a graphic image having a graphic equalizer screen associated with the music which is being reproduced through the music reproduction application that is executed in the background. Further, a graphic image that includes information on the music being reproduced (e.g., singer, song title, album name, etc.) may be displayed within the masking element 1202-1.

In this case, a graphic image that is displayed within the masking element 1202-1 may have a preset opacity level, and as illustrated in FIG. 12A, the opacity level may be set to nearly 0 to cause web page content that is displayed under the masking region 1202-1 not to be shown.

On the other hand, referring to FIG. 12B, the user may adjust the size and the position of the masking element 1202-2 through an operation of an adjustment bar 1203. For example, the user may extend the size of the masking element 1202-3 with respect to region 1201. For example, as shown in FIG. 12B, if the user performs a preset operation, for example, if the user touches and drags the adjustment bar 1203 up to the end in the direction of the region 1201, the masking element may be extended to be displayed on the entire screen of the device 100.

In this case, the masking element 1202-2 may have a preset opacity level, and as illustrated in FIG. 12B, the web page content that is displayed under the masking region 1202-2 may penetrate the masking element 1202-2 to be shown with a preset luminance.

Further, through the user's operation to touch the graphic equalizer that is displayed within the masking region 1202-2, an execution screen of the corresponding music application may be displayed on the entire screen or within region 1201.

Figure 13:
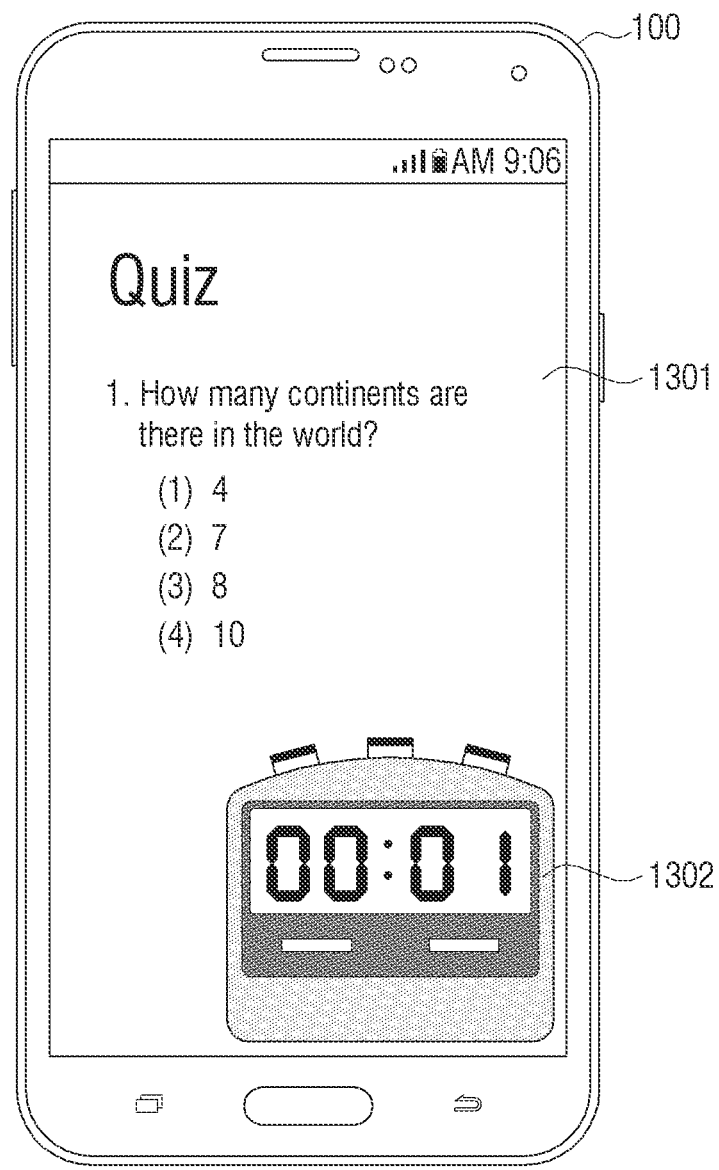
FIGS. 13 and 14 illustrate screens on which graphics are displayed as masking elements according to various embodiments of the present disclosure.
Figure 14:
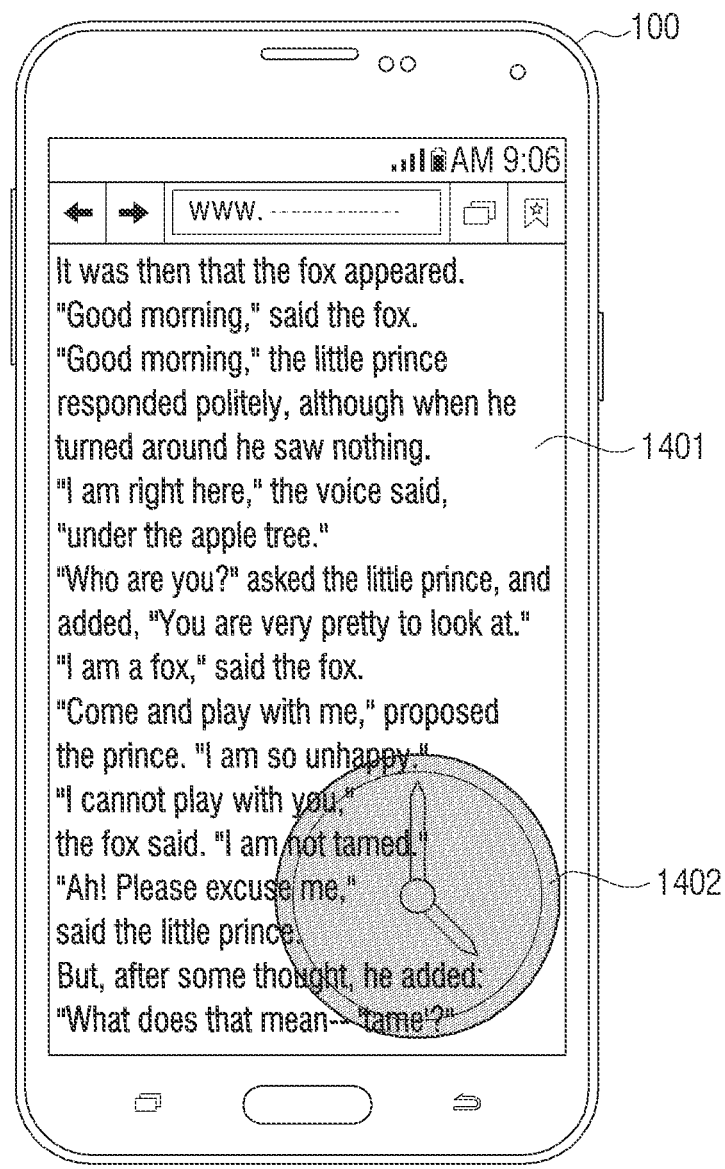

FIGS. 13 and 14 are views illustrating screens on which predetermined graphics are displayed as masking elements according to various embodiments of the present disclosure.

Referring to FIG. 13, the masking element 1302 may be a stop watch. Since the predetermined graphic can be moved by the user's operation on the displayed content screen, the masking element 1302 can be variously arranged within screen 1301, and the luminance level of the masking element 1302 is equal to or less than a preset luminance level such as that associated with region 1301.

The masking element 1302 may include mini applications that can provide various services, such as a calendar, a calculator, a memo pad, games, music, stocks, exchange rates, maps, and news, and the user may select a desired masking element 1302 from pre-stored graphics or download a necessary graphic element associated with the masking element 1302 from a server.

For example, as illustrated in FIG. 13, in the case where region 1301 includes a web page that provides an online test or quiz, the user may select that a masking element 1302 that provides a stopwatch function. In this case, the masking element 1302 may have a luminance level that is equal to or less than a preset luminance value or may have a preset opacity level to provide a preset visibility with respect to the penetrating content. In this case, the luminance and the opacity of masking element 1302 can be adjusted by the user.

In another exemplary embodiment, one or more graphic images may be displayed as a masking element. When a plurality of graphic images is implemented, each graphic image may be a different type of masking element (e.g., graphic associated with content, predetermined graphic, application execution screen, etc.), and/or have different sizes, shapes, and/or positions within the screen of the display 100.

Further, the user may adjust the size of the masking element 1302 as the user desires. For example, the user may reduce or extend the size of the masking element 1302 through touching and dragging an edge of the masking element 1302. In the case where the size of the region corresponding to an interest of the user is small, the user can relatively extend the size of the masking element 1302, and thus power consumption is correlated with the region corresponding to the interest of the user.

Alternatively, referring to FIG. 14, the masking element 1402 that overlaps the screen 1401 may provide a watch function. In this case, the masking element 1402 may have a luminance level that is equal to or less than a preset luminance value, and may have a preset opacity to secure visibility with respect to the content that is displayed under the masking element 1402.

Figure 15:
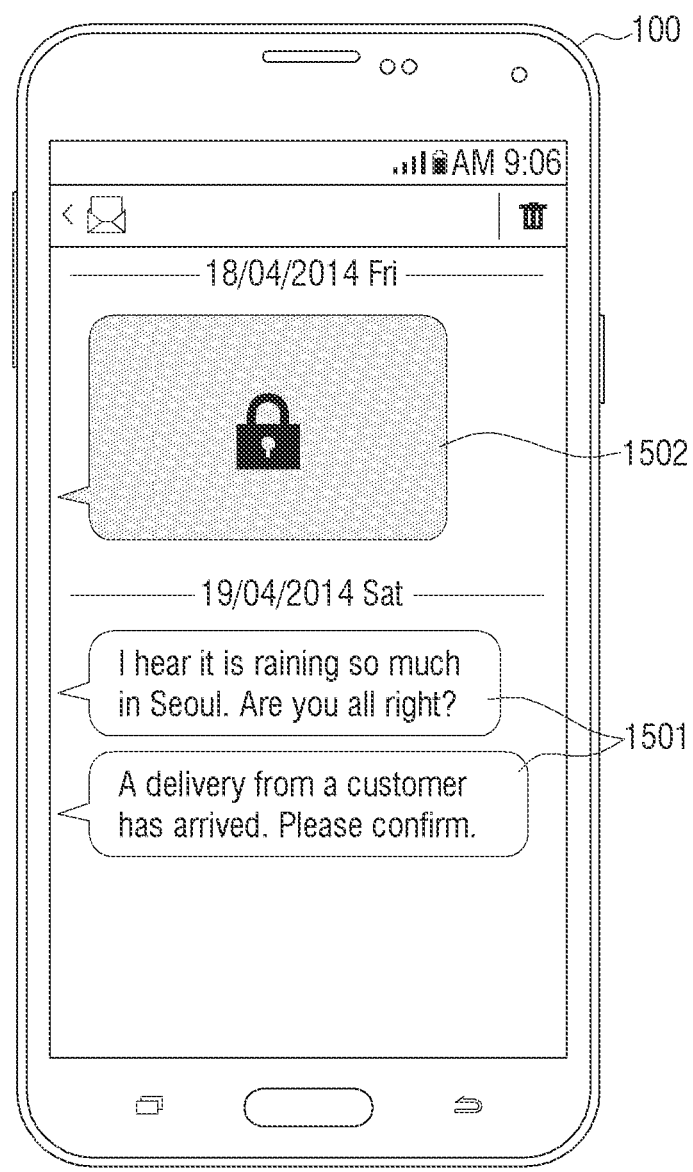
FIG. 15 illustrates a screen on which a masking element of which a locking function is set is displayed on a message according to an embodiment of the present disclosure.

FIG. 15 illustrates a screen on which a masking image of which a locking function is set is displayed on a message according to an embodiment of the present disclosure.

Referring to FIG. 15, a display device 100 may display a masking element 1502 over at least one of a plurality of pieces of content on a content screen. In this case, if a plurality of pieces of content having different update times is provided on the content screen, a processor 120 may determine to display the masking element 1502 over at least one piece of content based on update times associated with each piece of content.

Specifically, as illustrated in FIG. 15, in the case where a plurality of messages 1501 and 1502 are displayed on a screen of the device 100. Each message 1501 and 1502 may be considered a separate piece of content. Here, messages 1501 may be received at a later time than message 1502. Processor 120 may determine that the messages 1501 received on Apr. 19, 2014, have an update time different from the messages of Apr. 18, 2014. Based on the update time, a masking element 1502 may be displayed over the message received on Apr. 18, 2014.

The masking element 1502 may be displayed over at least one of the remaining messages except for the messages 1501 that is determined as the user's messages of interest (e.g., a region corresponding to an interest of the user). Here, the masking element may be a graphic image which has a luminance level that is equal to or less than the preset luminance value and of which a locking function is set to change the corresponding message to a locking state such that the message is not accessible unless it is converted to an unlocked state. For example, as illustrated in FIG. 15, masking element 1502 includes an image of a lock indicating that the message is in a locked state and is displayed over the message 1502 received on Apr. 18, 2014. Accordingly, the display device 100 may lower the luminance level of the message associated with the masking element 1502 that is not the user's message of interest below the preset luminance value.

Alternatively, the content, on which the masking element is displayed over, may be determined on the basis of the update time, or may be diversely changed in accordance with the user's setting. For example, the content that the masking element 1502 is displayed over may include content that is included in the preset screen region or content that is selected by the user.

Further, by setting the message that is not the user's message of interest to a locking state, the user's privacy may be enhanced.

Figure 16A:
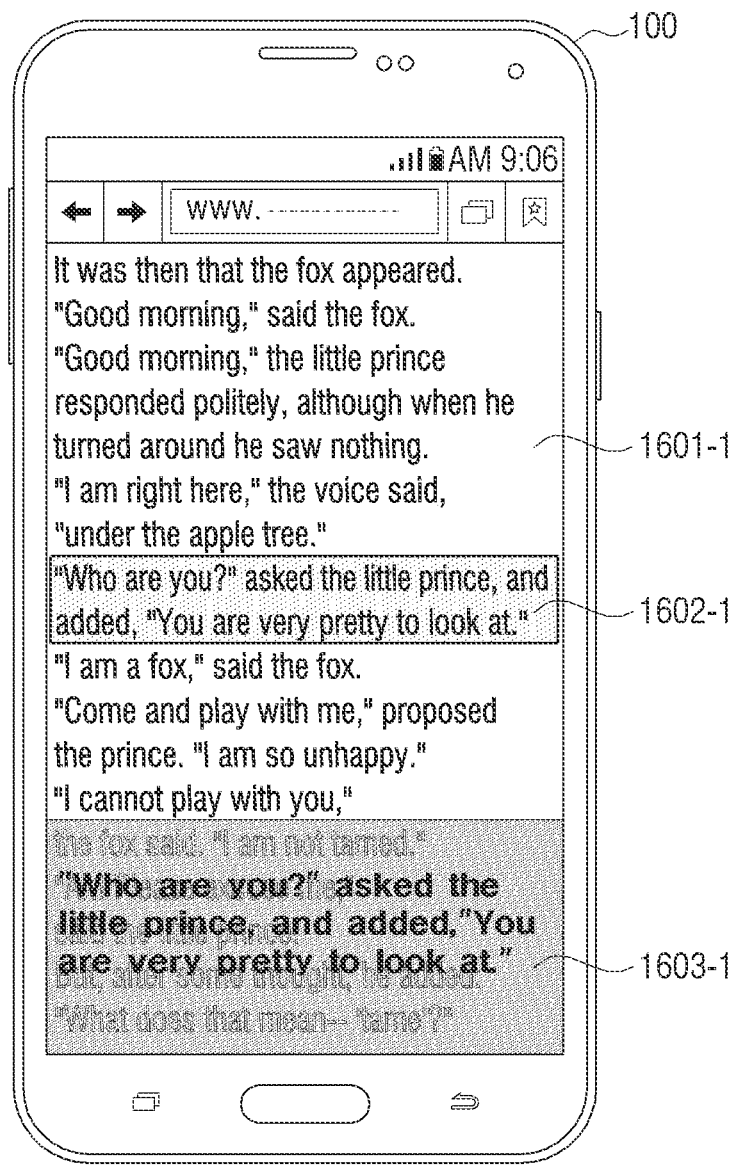
FIGS. 16A and 16B illustrate screens on which masking elements that indicate clipboards are displayed according to an embodiment of the present disclosure.
Figure 16B:
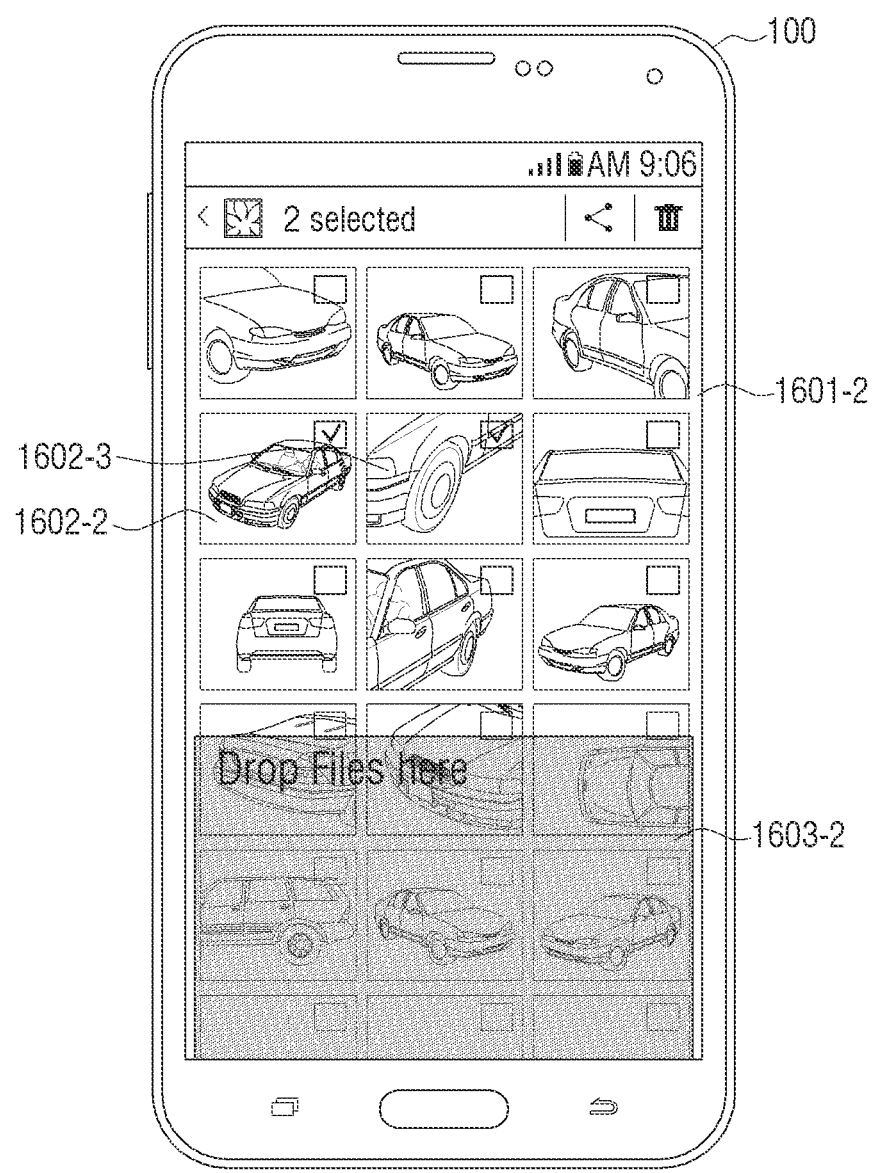

FIGS. 16A and 16B are views illustrating screens on which masking images that indicate clipboards are displayed according to an embodiment of the present disclosure.

Referring to FIG. 16A, a masking image may display information that is stored in a short-term data storage element (e.g., a clipboard), or perform a function to duplicate information associated with content (e.g., clipping) included in a region corresponding to an interest of a user.

Specifically, the display screen of device 100 may be divided into a region 1601-1 and a masking element 1603-1. In this case, masking element 1603-1 has a preset opacity and may have a luminance level that is equal to or lower than a preset luminance value. Accordingly, the content that is displayed under the masking region 1603-1 can penetrate the masking element to provide a preset visibility.

The user may clip partial content 1602-1 among content included in the region 1601-1. For example, as illustrated in FIG. 16A, the user may copy a sentence 1602-1 on the region 1601-1 of interest through touching and dragging the sentence, and the copied sentence 1602-1 may be stored in a memory region that is secured to be used as a temporary storage. Here, the memory region may be included in the RAM provided in the processor 120. In this case, the sentence 1602-1 that is stored in the clipboard may be included in the masking element 1603-1, and thus the user can confirm information that is stored in the clipboard through the masking element 1603-1.

Further, the user can conveniently clip the corresponding sentence 1602-1 only by selecting the sentence 1602-1 to be copied on the region 1601-1 of interest and then touching and dragging the sentence to the masking element 1603-1. That is, the masking element 1603-1 may perform a clipping function with respect to the content included in the region 1601-1 of interest.

FIG. 16B illustrates an embodiment of the present disclosure in which clipping is performed with respect to the content that is included in the region corresponding to an interest of the user.

Referring to FIG. 16B, a target of clipping may include a photo, a picture, or a moving image file, and the user may directly select and clip the photo, the picture, or the moving image file 1602-3 through an image application. The user may copy the corresponding file into the clipboard by selecting 1602-3 and dragging the file to be copied from region 1601-2 to the masking element 1603-2. Since the selected files are continuously displayed within the masking element 1603-2, the user can confirm the files that are stored in the clipboard through the masking element 1603-2.

On the other hand, the masking element 1603-2 may have a preset opacity and may not include content. In addition, masking element 1603-2 may have a luminance level that is equal to or less than a preset luminance value.

Figure 17:
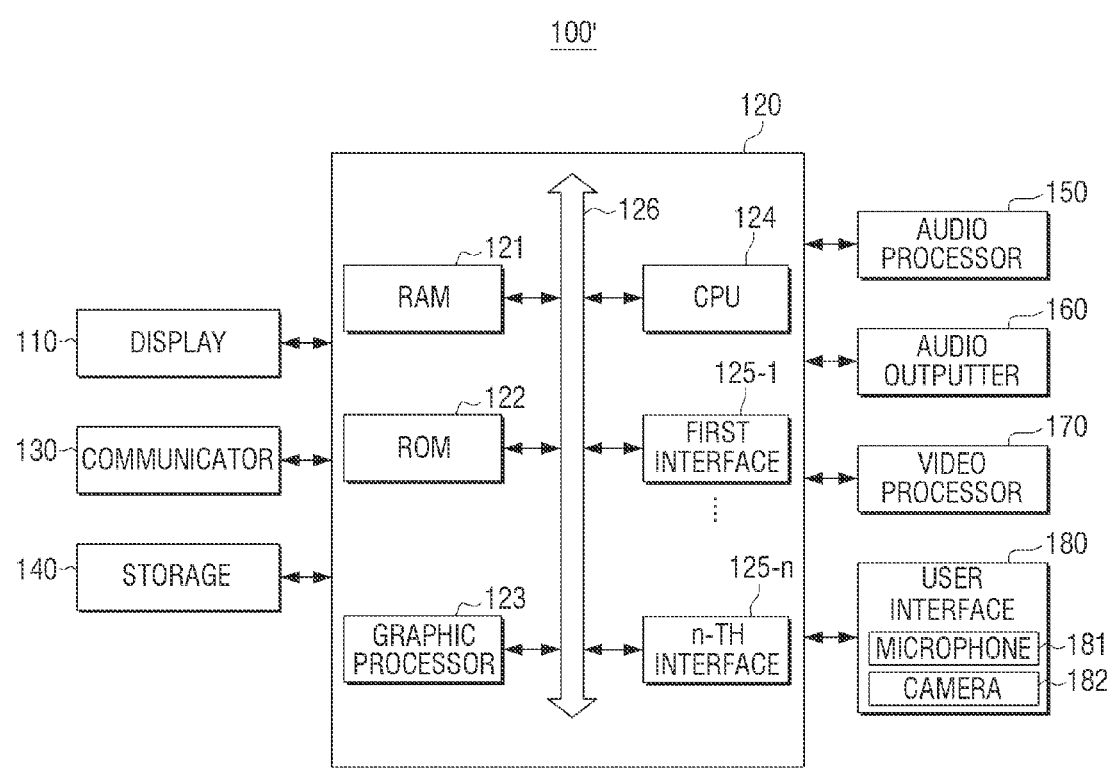
FIG. 17 is a block diagram illustrating in detail the configuration of a display device according to an embodiment of the present disclosure.

FIG. 17 is a block diagram illustrating in detail the configuration of a display device according to an embodiment of the present disclosure.

Referring to FIG. 17, a display device 100' includes a display 110, a processor 120, a communicator 130, a storage 140, an audio processor 150, an audio outputter 160, a video processor 170, and a user interface 180. Hereinafter, explanation of the duplicate portions as described above with reference to FIG. 1 will be omitted.

The communicator 130 is a configuration that performs communication with an external server or another device. The communicator 130 may perform communication with a server or another device through various communication methods using radio frequency (RF) and infrared (IR), such as Bluetooth, and Wi-Fi, Zigbee, Near Field Communication (NFC). For this, the communicator 130 may include at least one communication device in accordance with the above-described communication methods.

The storage 140 may store various modules for driving the display device 100'.

Specifically, the storage 140 may store a base module that processes signals that are transferred from hardware devices included in the display device 100', a storage module that manages a database (DB) or registry, a secure module, and a communication module. Further, the storage 140 may additionally store a graphic processing module for generating various layout screens and eye sensing module for extracting the region corresponding to an interest of the user.

The audio processor 150 is a constituent element that processes audio data. However, the processing of the audio data may be performed by an audio processing module that is stored in the storage 140.

The audio outputter 160 is a constituent element that outputs an audio signal. The audio outputter 160 may include a receiver terminal and a speaker.

The video processor 170 is a constituent element that performs various image processes, such as content decoding, scaling, noise filtering, frame rate conversion, and resolution conversion. However, the video processing may be performed by a video processing module that is stored in the storage 170.

The user interface 180 is a constituent element that senses user interaction for controlling the whole operation of the display device 100'. In particular, the user interface 180 may include various interaction sensing devices, such as a microphone 181 and a camera 182.

The microphone 181 is a constituent element for receiving an input of a user's voice command or recognizing user's voice to identify the user.

The camera 182 is a constituent element for sensing a user's eye to extract a region corresponding to an interest of the user from the display screen. Specifically, the user's eye may be sensed by tracking a user's pupil region through the camera 182, and the processor 120 may extract the region corresponding to the interest of the user from the display screen based on the sensed user's eye.

The processor 120 controls the whole operation of the display device 100' using various kinds of modules stored in the storage 140.

As illustrated in FIG. 17, the processor 120 may include a random access memory (RAM) 121, a read-only memory (ROM) 122, a graphic processor 123, a central processing unit (CPU) 124, and first to n-th interfaces 125-1 to 125-*n*, and the RAM 121, the ROM 122, the graphic processor 123, and the first to n-th interfaces 125-1 to 125-*n* may be connected to one another through a bus 126.

The ROM 122 stores a command set for system booting. The CPU 124 copies various kinds of application programs stored in the storage 140 into the RAM 121, and performs various kinds of operations by executing the application programs copied into the RAM 121.

The graphic processor 123 performs graphic processing through a graphic processing module that is stored in the storage 140. The graphic processor 123 generates a screen that includes various objects, such as icons, images, and texts using an operator (not illustrated) and a renderer (not illustrated). The operator operates attribute values, such as coordinate values, shapes, sizes, and colors of the objects to be displayed according to the layout of the screen. The renderer generates various layout screens including the objects on the basis of the attribute values operated by the operator.

The CPU 124 accesses the storage 140 and performs booting using the OS stored in the storage 140. Further, the main CPU 124 performs various operations using various kinds of programs, content, and data stored in the storage 140.

The first to n-th interfaces 125-1 to 125-*n* are connected to the various kinds of constituent elements as described above. One of the interfaces may become a network interface that is connected to an external device through a network.

Figure 18:
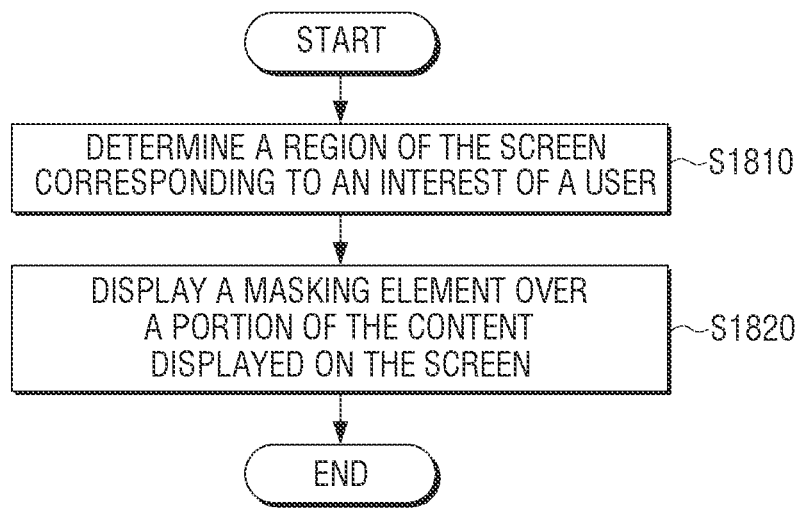
FIG. 18 is a flowchart illustrating a method for controlling a display device according to an embodiment of the present disclosure.

FIG. 18 is a flowchart illustrating a method for controlling a display device according to an embodiment of the present disclosure.

First, a region corresponding to an interest of the user is extracted from a display screen at operation S 1810. In this case, the region may be a preset region on the display screen. Further, the region may be a region that is extracted on the basis of a user's eye that is sensed by a camera.

Thereafter, a masking element having a luminance level that is equal to or less than a preset luminance level is displayed over at least a portion of the display screen based on the region of the display screen determined to correspond to the interest of the user at operation S 1820.

As described above, according to various embodiments of the present disclosure, the power consumption of the display screen can be reduced by adjusting the luminance level of the display device so as to minimize the disturbance of the user's content viewing.

The method for controlling a display device according to various embodiments of the present disclosure as described above may be implemented by programs to be stored in various recording media. That is, a computer program, which can be processed by various kinds of processors to execute the above-described various control methods, may be stored in the recording media to be used.

As an example, a non-transitory computer readable medium, which stores a program that performs determining a region corresponding to an interest of a user in the content displayed on the screen and displaying a masking element over a portion of the content displayed on the screen based on the region of the screen determined to correspond to the interest of the user where the masking element may be displayed at a luminance level equal to or less than a luminance level associated with the content displayed on the screen, may be provided.

The non-transitory computer readable medium is not a medium that stores data for a short period, such as a register, a cache, or a memory, but means a medium which semi-permanently stores data and is readable by a device. Specifically, the above-described programs may be stored and provided in the non-transitory computer readable medium, such as, a compact disc (CD), a digital versatile disc (DVD), a hard disc, a Blu-ray disc, a universal serial bus (USB), a memory card, and a ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A display device comprising:
a display configured to display content on a screen; and
a processor configured to:
   in response to receiving a first user input, display a masking element on a first area of the screen, wherein a part of the content displayed on the first area is overlapped with the masking element, and
   in response to receiving a second user input, move the part of the content from the first area to a second area of the screen on which the masking element is not displayed,
wherein a luminance level of the masking element is lower than a luminance level of the content, and
wherein a luminance level of the part of the content which is overlapped with the masking element is lower than a luminance level of a remaining part of the content which is not overlapped with the masking element.

2. The display device of claim 1, wherein the processor is further configured to, in response to receiving a third touch input, change a size or a position of the masking element.

3. The display device of claim 1, wherein the masking element has an opacity level different from an opacity level of the content displayed on the screen.

4. The display device of claim 1, wherein the masking element comprises at least one of an image, one or more alphanumeric characters, or one or more symbols.

5. The display device of claim 4, wherein the image comprises at least one of a graphic generated based on the content, a predetermined graphic, or an application execution screen.

6. The display device of claim 1, wherein the masking element includes information stored in a short-term data storage element of the display device.

7. The display device of claim 6,
wherein the processor is further configured to duplicate information associated with the content displayed on the screen, and
wherein the masking element includes the duplicated information associated with the content displayed on the screen and stored in the short-term data storage element of the display device.

8. The display device of claim 1, wherein the processor is further configured to:
detect a current battery level of a battery of the display device, and
display the masking element based on the detected current battery level and a total battery capacity associated with the battery of the display device.

9. The display device of claim 8, wherein the processor is further configured to:
compare the current battery level with the total battery capacity associated with the battery of the display device, and
determine a size, a shape, or a position of the masking element based on the current battery level and the total battery capacity associated with the battery.

10. The display device of claim 1, wherein the processor is configured to, in response to receiving a drag input to the screen while the content is displayed on the screen, display the masking element from a predetermined area according to a direction of the drag input.

11. The display device of claim 1, wherein the processor is configured to, in response to receiving a third user input while the masking element is displayed on the first area of the screen, adjust a size of the masking element according to the third user input.

12. The display device of claim 11, wherein the third user input comprises a user input for dragging the masking element in a direction.

13. A method for displaying a masking element on a display device, the method comprising:
in response to receiving a first user input, displaying a masking element on a first area of the screen, wherein a part of the content displayed on the first area is overlapped with the masking element; and
in response to receiving a second user input, move the part of the content from the first area to a second area of the screen on which the masking element is not displayed,
wherein a luminance level of the masking element is lower than a luminance level of the content, and
wherein a luminance level of the part of the content which is overlapped with the masking element is lower than a luminance level of a remaining part of the content which is not overlapped with the masking element.

14. The method of claim 13, wherein the method further comprises:
in response to receiving a third touch input, changing a size or a position of the masking element.

15. The method of claim 13, wherein the masking element has an opacity level different from an opacity level of the content displayed on the display screen.

16. The method of claim 13, wherein the masking element comprises at least one of an image, one or more alphanumeric characters, or one or more symbols.

17. The method of claim 16, wherein the image comprises at least one of a graphic generated based on the content, a predetermined graphic, or an application execution screen.

18. The method of claim 13, wherein the masking element includes information stored in a short-term data storage element of the display device.

19. The method of claim 18,
wherein the method further comprises duplicating information associated with the content displayed on the screen, and
wherein the masking element includes the duplicated information associated with the content displayed on the display screen and stored in the short-term data storage element of the display device.

20. The method of claim 13, wherein the method further comprises:
detecting a current battery level of a battery of the display device;
comparing the current battery level with a total battery capacity associated with the battery of the display device; and
determining a size, a shape, or a position of the masking element based on the current battery level and the total battery capacity associated with the battery.

* * * * *